(12) United States Patent
Ono

(10) Patent No.: US 7,646,507 B2
(45) Date of Patent: Jan. 12, 2010

(54) CALIBRATION SYSTEM AND CALIBRATION METHOD

(75) Inventor: Satoru Ono, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 525 days.

(21) Appl. No.: 11/498,786

(22) Filed: Aug. 4, 2006

(65) Prior Publication Data

US 2007/0030525 A1    Feb. 8, 2007

(30) Foreign Application Priority Data

Aug. 5, 2005  (JP)  ............................. 2005-228670
May 29, 2006  (JP)  ............................. 2006-147997

(51) Int. Cl.
*G06F 15/00*   (2006.01)
*G06F 3/12*    (2006.01)
*G03F 3/08*    (2006.01)
*G06K 9/00*    (2006.01)

(52) U.S. Cl. ........................ 358/1.9; 358/1.15; 358/529; 382/167

(58) Field of Classification Search ........................ None
See application file for complete search history.

(56) References Cited

U.S. PATENT DOCUMENTS

| 4,641,184 | A  | * | 2/1987  | Alston .......................... 358/535 |
| 5,530,563 | A  | * | 6/1996  | Zimmermann et al. ....... 358/517 |
| 5,537,516 | A  | * | 7/1996  | Sherman et al. .............. 358/1.9 |
| 6,137,596 | A  | * | 10/2000 | Decker et al. ................. 358/1.9 |
| 6,229,916 | B1 | * | 5/2001  | Ohkubo ........................ 382/167 |
| 6,829,058 | B1 | * | 12/2004 | Kumada ..................... 358/1.15 |
| 7,006,705 | B2 |   | 2/2006  | Takayama et al. |
| 7,035,454 | B2 |   | 4/2006  | Kumada et al. |
| 7,206,094 | B2 |   | 4/2007  | Kumada et al. |
| 7,245,784 | B2 |   | 7/2007  | Takayama et al. |
| 7,391,928 | B2 |   | 6/2008  | Takayama et al. |
| 2007/0133026 | A1 | | 6/2007 | Kumada et al. |

FOREIGN PATENT DOCUMENTS

| JP | 2001-232917 A | 8/2001 |
| JP | 2001-325598 A | 11/2001 |
| JP | 2002-187314 A | 7/2002 |
| JP | 2002-279414 A | 9/2002 |

* cited by examiner

*Primary Examiner*—Mark K Zimmerman
*Assistant Examiner*—Barbara D Reinier
(74) *Attorney, Agent, or Firm*—Sughrue Mion, PLLC

(57) ABSTRACT

A calibration system includes: an image formation unit that outputs a patch sheet having a plurality of patch patterns based on different gradation values for each color of color material that is used; a selection unit that receives an instruction to select a device from among a plurality of color measurement devices comprising a first color measurement device and a second color measurement device of a lower color measurement accuracy than that of the first color measurement device; a color measurement unit that receives data of a color measurement result for the patch sheet that is color-measured by the color measurement device selected by the selection instruction; a color measurement value determination unit that acquires color measurement values for each of the patch patterns on the basis of the color measurement result data received; and a color adjustment unit that generates color correction information of the image formation unit on the basis of the color measurement values acquired. In the system, the output patch sheet is common irrespective of the color measurement device selected by the selection instruction and, when the second color measurement device is selected by the selection instruction, the color measurement value determination unit acquires, by averaging a plurality of the color measurement result data that exist in the patch pattern, the color measurement values for each of the patch patterns.

9 Claims, 19 Drawing Sheets

FIG. 18

| CYAN GRADATION VALUE | COORDINATE (a*, b*) ON INTERPOLATION CURVE L1 | COORDINATE (a*, b*) ON STANDARD VALUE CURVE L2 |
|---|---|---|
| C(255) | (a(Max)*, b(Max)*) | (a(Max)*, b(Max)*) |
| ~ | ~ | ~ |
| C(x+1) | (a(X+1)*, b(X+1)*) | (a(X+1)*, b(X+1)*) |
| C(x) | (aX*, bX*) | (a1*, b1*) |
| C(x)' | (a2*, b2*) | |
| C(x−1) | (a(X−1)*, b(X−1)*) | (a(X−1)*, b(X−1)*) |
| ~ | ~ | ~ |
| C(0) | (a(Min)*, b(Min)*) | (a(Min)*, b(Min)*) |

CALIBRATION SYSTEM AND CALIBRATION METHOD

CROSS-REFERENCE TO RELATED APPLICATIONS

This application is based upon and claims the benefit of priority from the prior Japanese Patent Application No. 2005-228670, filed on Aug. 5, 2005, and the prior Japanese Patent Application No. 2006-147997, filed on May 29, 2006, the entire contents of which are incorporated herein by reference.

BACKGROUND OF THE INVENTION

1. Field of the Invention

The present invention relates to a calibration system of a printing device and, more particularly, to a calibration system capable of executing efficient and high-quality calibration in an environment where a device is selectively used from a plurality of color measurement devices of varying accuracy during calibration.

2. Description of the Related Art

Generally speaking, an image formation device such as a printer performs image formation by ejecting ink or supplying toner onto a printing medium on the basis of image data represented by a density gradation value of each color. Further, the respective density gradation value of the image data undergoes image formation processing so that the densities (color value) of the image that is actually formed on the printing medium has the predetermined standard value (target value). Normally, image formation devices such as printers differ from one device unit to the next and the relationship (density characteristic) between the density gradation value and the color value that is actually output for the density gradation value is also different for each device unit. Therefore, color correction information (a color correction table, for example) that matches the concentration density of the device are established when the device is shipped from the factory and color correction processing based on the color correction information is performed for each of the density gradation values of the subject image data at the time of image formation.

However, variations in the environment and aging degradation of the respective parts occur as a result of using such an image formation device and variations arise in the state of the engine parts that actually perform the image formation on the printing medium. Accordingly, because the above density characteristics are also changed, the initial color correction information must be suitably adjusted in order to hold the output result at the target value.

As a result, calibration of the image formation device has conventionally been performed and one such method of calibration is a method that employs a patch sheet. Such a method outputs a patch sheet on which are printed a plurality of patch patterns produced by varying the gradation values of the respective image data for each color of the color materials (toner, ink or the like) used by the image formation device. Further, the density (color value) of the respective patch pattern on the patch sheet is read and measured by a color measurement device such as a color measurement mechanism and the color correction information (color correction table, for example) is updated in order to correct the differences between the target value estimated for the gradation value of the respective patch and the actual measurement value.

Because a plurality of patch patterns printed at color densities that correspond with gradation values of predetermined intervals are color-measured in such calibration, this does not mean that printing and color measurement of the patch patterns are performed for colors corresponding with all the gradation values constituting the subject of the color correction information (color correction table or the like). In other words, the color measurement results of the patch pattern are scattered data. As a result, color correction information (color correction table or the like) for all the gradation values is determined by performing processing to interpolate the gradation value intervals of the patch patterns at any stage from the scattered data thus obtained.

In this case, when the color measurement device for color-measuring the patch patterns is a device of low color measurement accuracy such as a scanner, errors contained in the individual measurement values are large and, therefore, the error also greatly affects the interpolation processing. Therefore, in order to keep the effect to a minimum, interpolation processing of all gradation values is performed by using a higher order polynomial with high interpolation accuracy when a color measurement device with low color measurement accuracy is used. However, because a multiplicity of referenced measurement values are required for this purpose, a patch pattern with a greater number of patches distributed thereon is required.

Thus, a patch pattern that permits highly accurate gradation-value interpolation, that is, which permits high-quality calibration, has different requirements depending on the relative merits of the color measurement accuracy of the color measurement device being used. Therefore, in an environment permitting the selection of a plurality of color measurement devices possessing the relative merits of color measurement accuracy on a network, the preferred patch patterns for raising the calibration accuracy of the printing device vary depending on the color measurement device. Hence, a method for changing the patch patterns that are printed in accordance with the type of color measurement device being used has been proposed. Such a method appears in Japanese Patent Application Laid Open No. 2001-232917, for example.

However, the conventional method above has been confronted by complications in that patch patterns that correspond with each of the color measurement devices must be prepared and a plurality of patch pattern data must be provided and managed. Further, suppose that, after printing patch patterns suited to a certain color measurement device on a patch sheet, the color measurement device that is being used is changed due to the inconvenience of the color measurement device or the selection of a more accurate color measurement device, there has been the problem that the printed patch sheet is then of no use. There has also been the possibility that, when a color measurement device is not connected during printing of the patch sheet and undecided, suitable patch patterns cannot be selected or a drop in the calibration accuracy is induced when a patch sheet with patch patterns for another color measurement device is used.

In addition, in the case of a color measurement device of low accuracy such as a scanner, there is a large number of patches as mentioned earlier, patch patterns are output over the whole surface of the printing medium, and the output area widens. Hence, the patches are susceptible to the effects of in-plane unevenness of printing and in-plane errors, which is unfavorable for high-quality calibration.

SUMMARY OF THE INVENTION

Therefore, an object of the present invention is to provide a calibration system capable of executing efficient and high-quality calibration in an environment where a device is selectively used from a plurality of color measurement devices of varying accuracy during calibration, which is a calibration system for a printing device.

In order to achieve the above object, one aspect of the present invention is a calibration system, comprising: an image formation unit that outputs a patch sheet having a plurality of patch patterns based on different gradation values for each color of color material that is used; a selection unit that receives an instruction to select a device from among a plurality of color measurement devices comprising a first color measurement device and a second color measurement device of a lower color measurement accuracy than that of the first color measurement device; a color measurement unit that receives data of a color measurement result for the patch sheet that is color-measured by the color measurement device selected by the selection instruction; a color measurement value determination unit that acquires color measurement values for each of the patch patterns on the basis of the color measurement result data received; and a color adjustment unit that generates color correction information of the image formation unit on the basis of the color measurement values acquired, wherein the output patch sheet is common irrespective of the color measurement device selected by the selection instruction; and, when the second color measurement device is selected by the selection instruction, the color measurement value determination unit acquires, by averaging a plurality of the color measurement result data that exist in the patch pattern, the color measurement values for each of the patch patterns.

In order to achieve the above object, another aspect of the present invention is a calibration system, comprising: an image formation unit that outputs a patch sheet having a plurality of patch patterns based on different gradation values for each color of color material that is used; a selection unit that receives an instruction to select a device from among a plurality of color measurement devices comprising a first color measurement device and a second color measurement device of a lower color measurement accuracy than that of the first color measurement device; a color measurement unit that receives data of a color measurement result for the patch sheet that is color-measured by the color measurement device selected by the selection instruction; a color measurement value determination unit that acquires color measurement values for each of the patch patterns on the basis of the color measurement result data received; and a color adjustment unit that determines, for each of the colors of the color material, color measurement values for all the possible gradation values on the basis of each of the acquired color measurement values and the gradation values of the respective patch patterns corresponding with each of the color measurement values, and generates color correction information of the image formation unit by comparing the color measurement values determined with predetermined standard values, wherein the output patch sheet is common irrespective of the color measurement device selected by the selection instruction; when the first color measurement device is selected by the selection instruction, the color adjustment unit represents the color measurement values determined for all the gradation values by means of information of a first color system that differs from the color system of the color material, and compares the color measurement values with the standard values; and, when the second color measurement device is selected by the selection instruction, the color adjustment unit represents the color measurement values determined for all the gradation values by means of information of the first color system and information of a second color system that differs from the color system of the color material and the first color system, and compares the color measurement values with the standard values.

Further, according to a preferred aspect of the present invention, the color adjustment unit approximates the relationship between the gradation values and the color measurement values by means of a higher order polynomial from the acquired respective color measurement values and the gradation values of the respective patch patterns corresponding with the acquired respective color measurement values and determines the color measurement values for all the gradation values by means of the higher order polynomial higher.

In addition, according to a preferred aspect of the present invention, when the higher order polynomial is determined, the color adjustment unit performs weighting on some or all of the acquired color measurement values.

Furthermore, according to one aspect of the present invention, the color adjustment unit performs the weighting on the basis of the color measurement value that corresponds with the ground color of the patch sheet.

According to another aspect of the present invention, the color adjustment unit performs the weighting on the color measurement values of the patch patterns that correspond with a maximum gradation value and a minimum gradation value.

In addition, according to one aspect of the present invention, color correction processing by the color correction information is performed in conjunction with processing to convert the color system of image data for the execution of image formation by the image formation unit into the color system of the color material.

Further, according to a preferred aspect of the present invention, the second color measurement device is a scanner.

Furthermore, according to a preferred aspect of the present invention, the information of the second color system used by the color adjustment unit is information on a color of the second color system in a complementary color relationship with the targeted color of the color material.

In order to achieve the above object, another aspect of the present invention is a method of calibrating a printing device by means of a calibrator, comprising: outputting, by the printing device, a patch sheet having a plurality of patch patterns based on different gradation values for each color of color material that is used; receiving, by the calibrator, an instruction to select a device from among a plurality of color measurement devices comprising a first color measurement device and a second color measurement device of a lower color measurement accuracy than that of the first color measurement device; receiving, by the calibrator, data of color measurement results for the patch sheet that is color-measured by the color measurement device selected by the selection instruction; acquiring, by the calibrator, color measurement values for each of the patch patterns on the basis of the color measurement result data received; and generating, by the calibrator, color correction information of the printing device on the basis of the color measurement values acquired, wherein the output patch sheet is common irrespective of the color measurement device selected by the selection instruction; and when the second color measurement device is selected by the selection instruction, the calibrator acquires, by averaging a plurality of the color measurement result data that exist in the patch pattern, the color measurement values for each of the patch patterns.

In order to achieve the above object, yet another aspect of the present invention is a method of calibrating a printing device by means of a calibrator, comprising: outputting, by the printing device, a patch sheet having a plurality of patch patterns based on different gradation values for each color of color material that is used; receiving, by the calibrator, an instruction to select a device from among a plurality of color measurement devices comprising a first color measurement device and a second color measurement device of a lower color measurement accuracy than that of the first color measurement device; receiving, by the calibrator, data of color measurement results for the patch sheet that is color-measured by the color measurement device selected by the selection instruction; acquiring, by the calibrator, color measurement values for each of the patch patterns on the basis of the color measurement result data received; and determining, by the calibrator, for each of the colors of the color material, color measurement values for all the possible gradation values on the basis of each of the acquired color measurement values and the gradation values of the respective patch patterns corresponding with each of the color measurement values, and generating, by the calibrator, color correction information of the printing device by comparing the color measurement values determined with predetermined standard values, wherein the output patch sheet is common irrespective of the color measurement device selected by the selection instruction; and when the first color measurement device is selected by the selection instruction, the calibrator represents the color measurement values determined for all the gradation values by means of information of a first color system that differs from the color system of the color material, and compares the color measurement values with the standard values; and, when the second color measurement device is selected by the selection instruction, the calibrator represents the color measurement values determined for all the gradation values by means of information of the first color system and information of a second color system that differs from the color system of the color material and the first color system, and compares the color measurement values with the standard values.

Further objects and characteristics of the present invention will become evident from the embodiment of the present invention described hereinbelow.

BRIEF DESCRIPTION OF THE DRAWINGS

FIG. 18 serves to illustrate processing to acquire a corrected gradation value C(x)' from the original gradation value C (x)

DESCRIPTION OF THE PREFERRED EMBODIMENTS

Embodiments of the present invention will be described hereinbelow with reference to the drawings. However, the technical scope of the present invention is not limited to these embodiments and covers the items appearing in the claims as well as any equivalent items.

Figure 1:
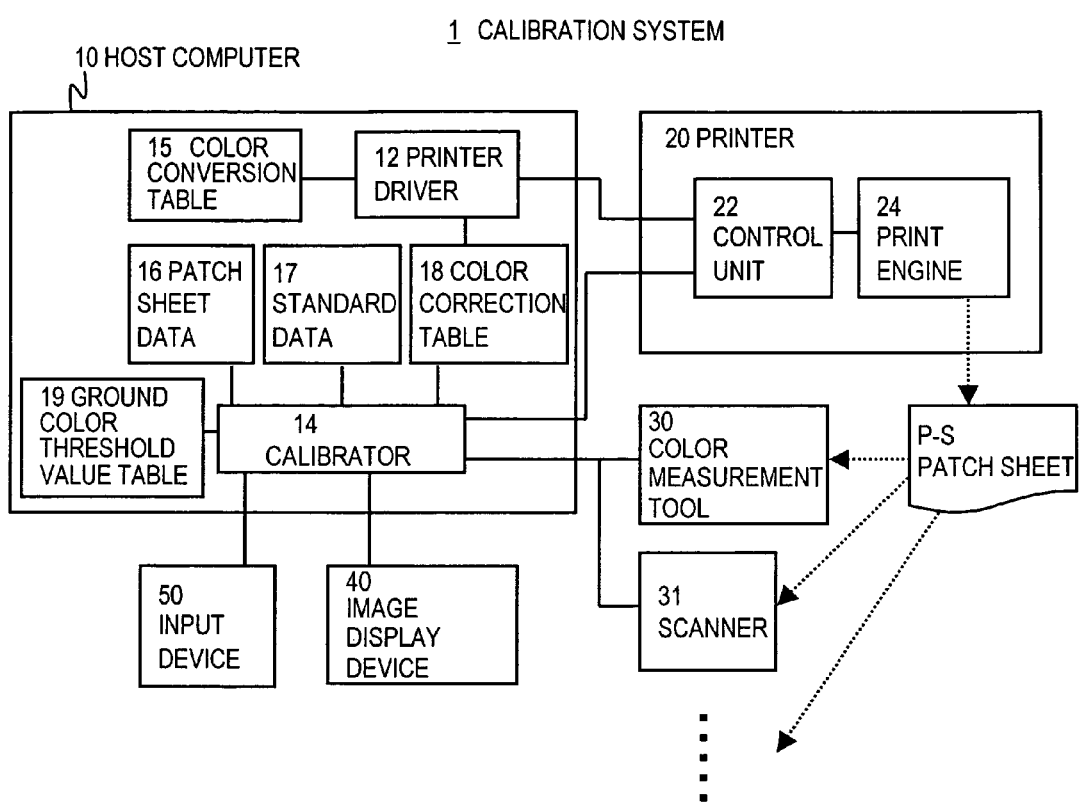
FIG. 1 is a constitutional view of an embodiment of the calibration system to which the present invention is applied.

FIG. 1 is a constitutional view of an embodiment of the calibration system to which the present invention is applied. The calibration system 1 shown in FIG. 1 is the system relating to this embodiment and includes the calibrator 14 (a selection unit, a color measurement unit, a color measurement value determination unit, and a color adjustment unit) that performs mainly the processing for calibration, a printer 20 (an image formation unit) constituting the target of the calibration and a color measurement machine 30 for color measurement, and so forth. This calibration system 1 performs color measurement on the outputted patch sheet P-S by means of the color measurement machine 30 or the like and updates the color correction table 18 on the basis of the color measurement result. In the calibration system 1, the color measurement device for color measurement is used after being selected from among devices of a plurality of types of varying accuracy (the color measurement machine 30 and scanner 31, for example) and a common patch sheet P-S is used irrespective of which color measurement device is selected. In addition, when a color measurement device with low accuracy is selected, the system adds processing to raise the calibration accuracy in the processing that follows the color measurement, in order to execute efficient and high-quality calibration even in an environment in which a plurality of color measurement devices of varying accuracy are employed.

As mentioned earlier, the calibration system 1 is including an image display device 40, a host computer 10 comprising an input device 50, a printer 20, and a color measurement machine 30 and so forth. The host computer 10 is connected by cables to the printer 20 and color measurement machine 30 but may also be connected via a network (not shown).

The host computer 10 is constituted by a personal computer and comprises a CPU, RAM, ROM, and a hard disk (not illustrated). The user interface of the host computer 10 comprises the image display device 40, and an input device 50 such as a keyboard and mouse. A track ball or another pointing device can also be used instead of the mouse for the input device 50.

As shown in FIG. 1, the host computer 10 comprises a printer driver 12, the calibrator 14, a color conversion table 15, patch sheet data 16, standard data 17, the color correction table 18, and a ground color threshold value table 19, and so forth.

The printer driver 12 is the driver used for the printer 20. When a print request is issued from the host computer 10 to the printer 20, the printer driver 12 generates print data for the printer 20 and transmits the print data to the printer 20 to execute a print instruction. Further, the printer driver 12 is constituted by a program that instructs the processing procedure and a CPU that executes processing in accordance with the program, or the like. Further, the printer driver 12 comprises an image data acquisition module, a color conversion module, and a print data generation module and so forth for executing printing (none of which is shown).

The color conversion table 15 is a table for performing the color conversion processing that is performed in the print data generation process performed by the printer driver 12. In this embodiment, the color conversion table 15 is a table for converting the image data represented by the sRGB color system into data of the CMYK color system and associates the colors of the sRGB color system with the colors of the CMYK color system. Accordingly, in relation to arbitrary color represented by the sRGB color system, by referring to a sRGB color specified in the color conversion table 15 which is peripheral color of the color, the color of the CMYK color system corresponding with the arvitrary color can be acquired and color conversion can be implemented.

The calibrator 14 is a part for performing calibration of the printer 20 which is a characteristic part of the calibration system 1. This calibrator 14 executes processing to receive calibration requests issued by the user, instruct the output of the patch sheet P-S, acquire color measurement values of the patch sheet P-S color-measured by the scanner 31 or the like, and update the color correction table 18.

Furthermore, when the scanner 31 is selected as the color measurement device, in the position detection of the patch patterns PP that is required when acquiring the color measurement values of the respective patch patterns PP, the image data of the patch sheet P-S and the detected positions are displayed for the user and confirmed and, if necessary, the user is allowed to perform a correction operation. Further, when the color measurement device is the scanner 31, one color measurement value is acquired for one patch by performing averaging from the results of measuring a plurality of points.

In addition, the interpolation processing required in order to generate the color correction table 18 as color correction information with respect to all the gradation values from the color measurement results acquired as scattered data based on the patch patterns is executed at the color measurement value stage and compared with the standard data 17 as information of a plurality of dimensions. In addition, when the color measurement device is the scanner 31, the color measurement values of the colors of the different color system may be added to the comparison with the standard data 17.

These points are main characteristics of this calibrator 14 and the specific content will be described subsequently. Further, the calibrator 14 is constituted by a program that instructs the processing procedure and a CPU that executes the processing in accordance with the program and so forth, and may be mounted as one module in the printer driver 12 mentioned earlier. Further, the program is supplied to the host computer 10 by installing the program stored on a recording medium such as a CD or being downloaded from a predetermined site via a network such as the Internet.

The patch sheet data 16 is print data for the patch sheet P-S that is output from the printer 20 during calibration and is recorded on a ROM or hard disk. The patch sheet data 16 is data that comprises a gradation value for each of the colors of each of the pixels. Here, the patch sheet data 16 is constituted by the respective gradation values (0 to 255) of C (cyan), M (magenta), Y (yellow), and K (black) which are colors of color materials used by the printer 20. Because the patch sheet P-S is common irrespective of the color measurement device as mentioned earlier, the patch sheet data 16 may be prepared as one type of common patch sheet P-S.

The standard data 17 is data indicating the densities (color values) that should be actually output to the respective gradation values of the image data. In other words, the standard data 17 are data for the color values acquired beforehand by measuring, by means of a color measurement tool, the color patches that are printed spanning all the gradation values for the respective CMYK colors by means of a predetermined standard printer. The standard data 17 is recorded in ROM or on a hard disk or the like. Here, the above-mentioned gradation values are represented as the gradation values of the respective CMYK colors and the above-mentioned densities (color values) are represented by $L^*a^*b^*$ values. Hence, the values of $L^*$, $a^*$, and $b^*$ are respectively decided for each gradation value of C, for example. In addition, in this embodiment, the standard data for the other color system are provided. More specifically, the data represented by the RGB color system acquired when color measurement is performed by the scanner 31 are also combined and held. In this standard data, the values of colors in a complementary color relationship for the respective colors of CMYK are respectively decided for the respective gradation values. Values of R in a complementary color relationship for C are respectively decided for the respective gradation values of C, values of G are respectively decided for the respective gradation values of M, values of B are respectively decided for the respective gradation values of Y, and values of $(R+G+B)/3$ are respectively decided for the respective gradation values of K. The standard data 17 are compared with the results of color measurement of the patch sheet P-S as standard values (target values) during calibration.

Thereafter, the color correction table 18 is a table that stores information for correcting the color information of the image data of the printing target when a print request is made by the printer driver 12, matching the density characteristics of the printer 20 so as to obtain an output (printing result) suited to the color information, in other words, to achieve representation in the densities indicated by the standard data 17. Here, the color correction table 18 is table that associates the corrected gradation values with the respective gradation values of each of the CMYK colors of the original image data. In this embodiment, the results of the calibration are reflected in the color correction table 18.

Figure 2:
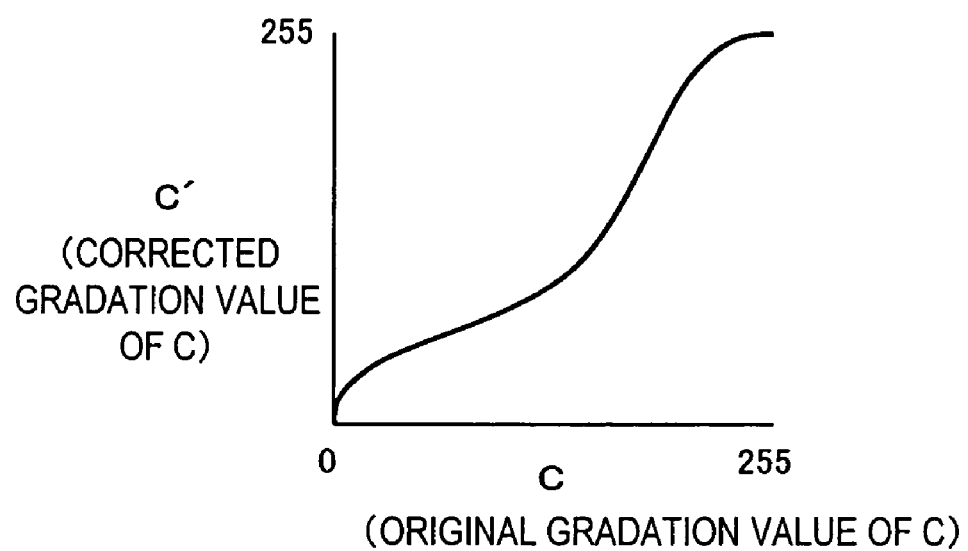
FIG. 2 serves to illustrate a color correction table 18.

FIG. 2 serves to illustrate the color correction table 18. FIG. 2 represents the color correction table for C by means of a graph, where the horizontal axis represents the original C gradation value (C) and the vertical axis represents the corrected C gradation value (C'). Further, the curve in FIG. 2 represents the relationship between C and C' and the C gradation value of the original image data is corrected on the basis of the correspondence relationship represented by the curve. Further, a similar color correction table is also prepared for the respective MYK colors. In addition, the color correction table 18 is stored in RAM or on a hard disk.

The ground color threshold value table 19 is used in the ground color correction of color measurement values (described subsequently) and is recorded in ROM or on a hard disk. Ground color correction serves to correct the measured color values of the patch patterns because the output colors of the printer 20 are sometimes not accurately reflected as a result of the patch with low gradation values in particular being affected by the ground color of the patch sheet paper or the like in the case of a patch pattern rendered through color measurement by means of the color measurement tool 30 or the like. The ground color threshold value table 19 holds ground color threshold value indicating whether to perform ground color correction and, when the ground color of color values exceeding the threshold value recorded in the ground color threshold value table is measured, ground color correction is executed.

Thereafter, the printer 20 is an image formation device constituting the calibration target and is an inkjet printer in which ink cartridges for each of a plurality of colors which are C (cyan), M (magenta), Y (yellow), and K (black) are installed but may also be a laser printer or a printer of another type. Further, a constitution with six colors, namely C, M, Y, K, lc (light cyan) and lm (light magenta) in place of a color constitution of CMYK material (ink) or a constitution with seven colors, namely C, M, Y, K, lc, lm, and DY (dark yellow) is also possible. As shown in FIG. 1, the printer 20 comprises a control unit 22 and a print engine 24.

The control unit 22 is a so-called controller which, upon receipt of a print request from the host computer 10, subjects the received print data to predetermined processing to produce data for use by the print engine 24 and issues a print instruction to the print engine 24. Further, when calibration processing is executed, the control unit 22 executes the same processing upon receipt of the patch sheet data 16. The control unit 22 is constituted by a CPU, RAM, ROM, ASIC, and so forth.

The print engine 24 is a part that performs printing on the printing medium on the basis of the data (signal) supplied by the control unit 22. During calibration processing, the print engine 24 outputs a patch sheet P-S in accordance with an instruction of the control unit 22.

Figure 3:
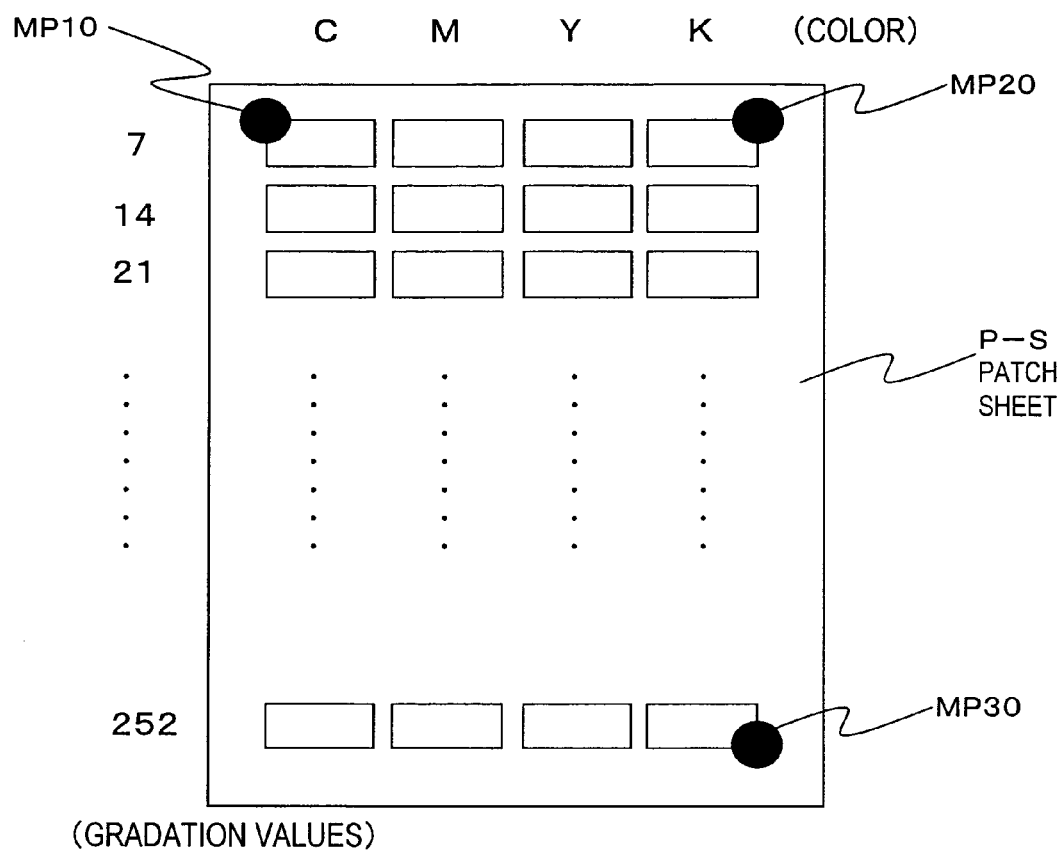
FIG. 3 shows an example of a patch sheet P-S.

The outputted patch sheet P-S is a sheet that has a plurality of patch patterns of the image data, outputted respectively for each color of the color material (ink) used by the printer 20 for varied gradation values in the printer 20. FIG. 3 shows an example of the patch sheet P-S. In the example shown in FIG. 3, patch patterns for each CMYK color are printed in four columns wherein each color (column) contains respective patch patterns (rectangles in FIG. 3) that are output by changing the gradation values. In the example shown here, whereas each color is represented by 256 gradations from 0 to 255, the patch patterns are output with gradations changed by seven gradation values at a time. Further, this method of variation is one example and variation is not limited thereto. Further, the images shown by means of black circles in FIG. 3 are marker patches MP10 to MP30 which have colors and/or density values that make them easily distinguished from the patch patterns. The patch sheet P-S is also commonly used irrespective of which device is selected as the color measurement device (described subsequently).

The color measurement machine 30 and scanner 31 are color measurement devices that can be used as devices for reading the patch sheet P-S in the calibration system 1. Other color measurement devices can also be used. During calibration, one device among these color measurement devices is selected and used. The selected color measurement device is connected by a cable to the host computer 10 and is controlled by the calibrator 14. During calibration processing, the patch sheet P-S put by the user is read and color measurement result data is supplied to the calibrator 14. The color measurement machine 30 and scanner 31 may be not connected to the host computer 10 at the moment when the patch sheet P-S is printed by the printer 20.

Furthermore, in this embodiment, the color measurement accuracy of the color measurement machine 30 is higher than that of the scanner 31 and, during color measurement, the densities (color values) of each patch are acquired as L*a*b* values and supplied to the calibrator 14. On the other hand, the scanner 31 has lower color measurement accuracy than the color measurement machine 30 and, during color measurement, the scanner 31 acquires the densities (color values) of the respective patches as RGB values and supplies them to the calibrator 14.

The specific processing procedure of the calibration system 1 with the constitution described above will be described hereinbelow.

First, the processing during normal printing by the printer 20 will be described. When the printer driver 12 in the host computer 10 receives a print request from an application that is the source of the print request, the printer driver 12 first converts the print-target image data from the received data format into an intermediate code. Thereafter, the intermediate code undergoes expansion processing and is converted into data (RGB data) that is constituted by the R (red) G (green) B (blue) gradation values of the respective pixels. Further, the RGB data is color-converted into CMYK data that is used by the printer 20 (CMYK data) by using the color conversion table 15. Thereafter, the CMYK data is corrected on the basis of the color correction table 18 mentioned earlier, whereupon the corrected data (C'M'Y'K' data) is compressed and transmitted to the printer 20.

The control unit 22 of the printer 20 decompresses the received data and transmits same to the print engine 24. The print engine 24 discharges the respective ink and executes image formation on the printing medium on the basis of the transmitted signal.

Although the processing during normal printing is performed as described hereinabove, the above content is an example. As long as the content can execute the color correction processing according to the results of the calibration (described subsequently), other processing content can also be adopted.

Figure 4:
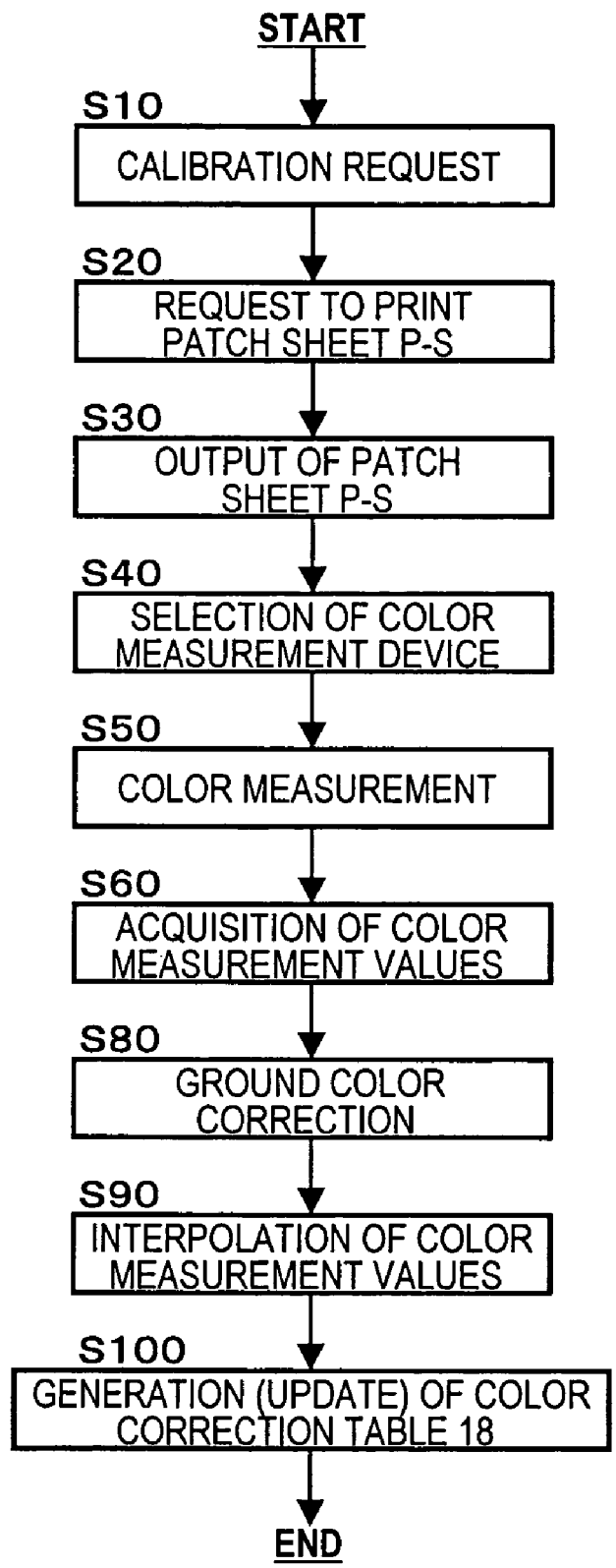
FIG. 4 is a flowchart that exemplifies the processing procedure during calibration.

The processing procedure of the calibration constituting a special part of this system 1 will be described next. FIG. 4 is a flowchart that exemplifies the processing procedure during calibration. First, the user issues a calibration execution request by using the input device 50 to the calibrator 14 of the host computer 10 (step S10). Upon receiving this request, the calibrator 14 reads the patch sheet data 16 and transmits same to the printer 20, and makes a patch sheet P-S print request (step S20).

The printer 20 receives the patch sheet data 16, executes the same processing as the processing executed during normal printing, and outputs a patch sheet P-S (step S30). As a result, the patch sheet P-S shown in FIG. 3 is output by the printer 20.

Thereafter, the color measurement device for performing color measurement of the patch sheet P-S is selected (step S40). In this case, the calibrator 14 encourages the user to make a selection by displaying a list of usable color measurement devices on the image display device 40, whereby the user is able to select an arbitrary color measurement device from the list and make an input by means of the input device 50. However, when there is a single selectable color measurement device, the calibrator 14 may automatically select the color measurement device and, even when a plurality of color measurement devices can be selected, a predetermined color measurement device may be automatically selected as a priority. The calibrator 14 receives the input of the user and judges the selected color measurement device.

Thereafter, the calibrator 14 causes the image display device 40 to display a message to the effect that the outputted patch sheet P-S is to be placed on the selected color measurement device and color-measured. Thereafter, the user installs the patch sheet P-S in a predetermined position of the color measurement device in accordance with the message and issues a color measurement execution instruction. The instruction may be issued by using the input device 50 to operate the instruction button displayed on the image display device 40 by the calibrator 14 or may be issued by using an operation section (not shown) with which the color measurement device is provided. As a result of this instruction, the color measurement device color-measures the patch sheet P-S (step S50).

The data for the results of the color measurement by the color measurement device is supplied to the calibrator 14 of the host computer 10 and the calibrator 14 acquires color measurement values (color values) for each patch on the patch sheet P-S (step S60).

Here, when the selected color measurement device is the color measurement machine 30, the color measurement machine 30 measures the color values of the patch patterns as L*a*b* values and the calibrator 14 acquires the color values for each patch as L*a*b* values from the color measurement results. Hence, by acquiring a L* value, an a* value, and a b* value for each patche (any of the CMYK colors and the gradation value thereof), four-dimensional information of the gradation values, L* values, a* values, and b* values can be acquired for each of the CMYK colors. The acquired information is then compared with the standard data 17 which constitutes information of the same format.

Figure 5:
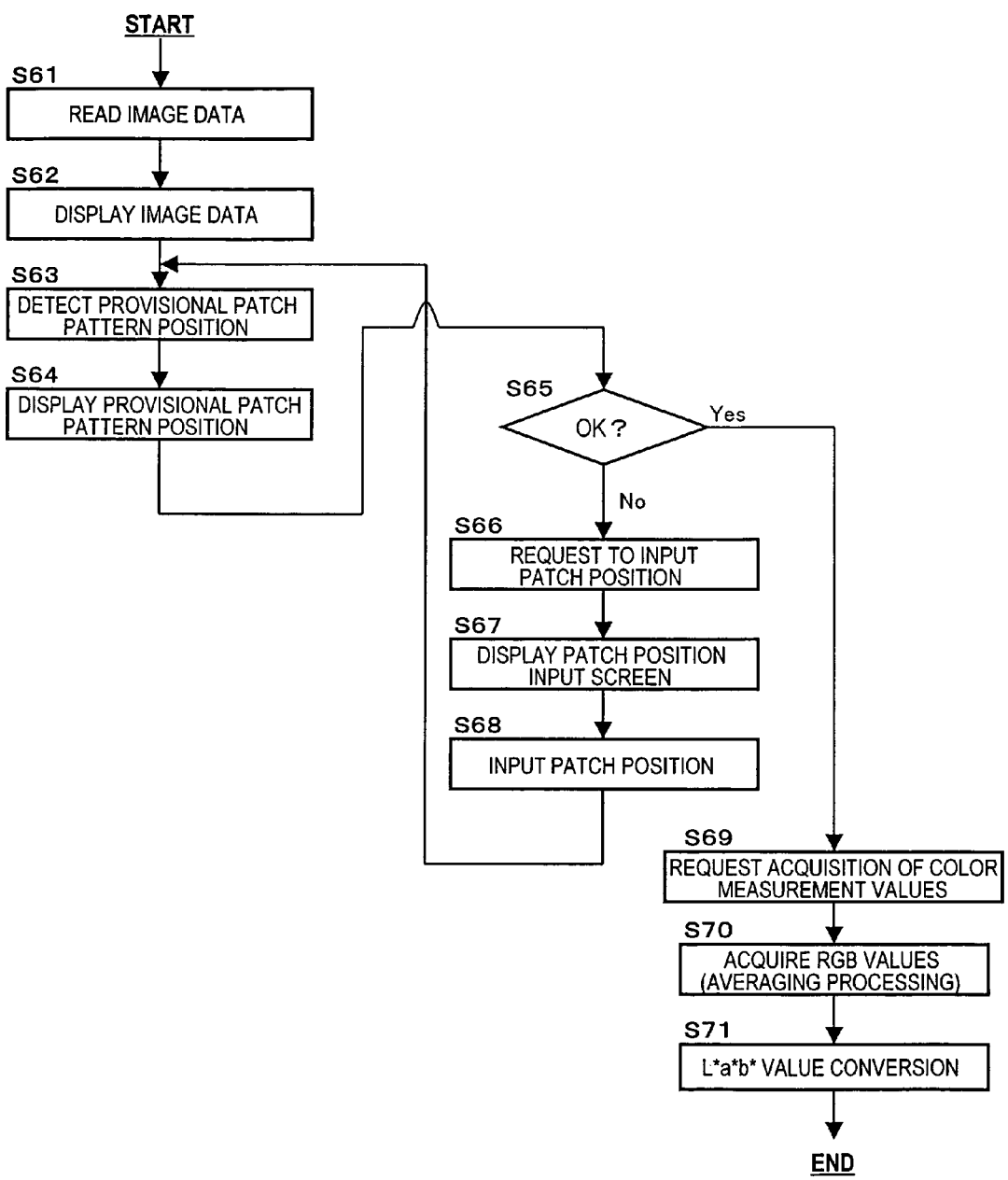
FIG. 5 is a flowchart that exemplifies the procedure of processing to acquire color measurement values.

On the other hand, when the color measurement device thus selected is the scanner 31, the acquisition (S60) of color measurement values is performed as detailed below. FIG. 5 is a flowchart that exemplifies the procedure of the processing to acquire the color measurement values.

Figure 6:
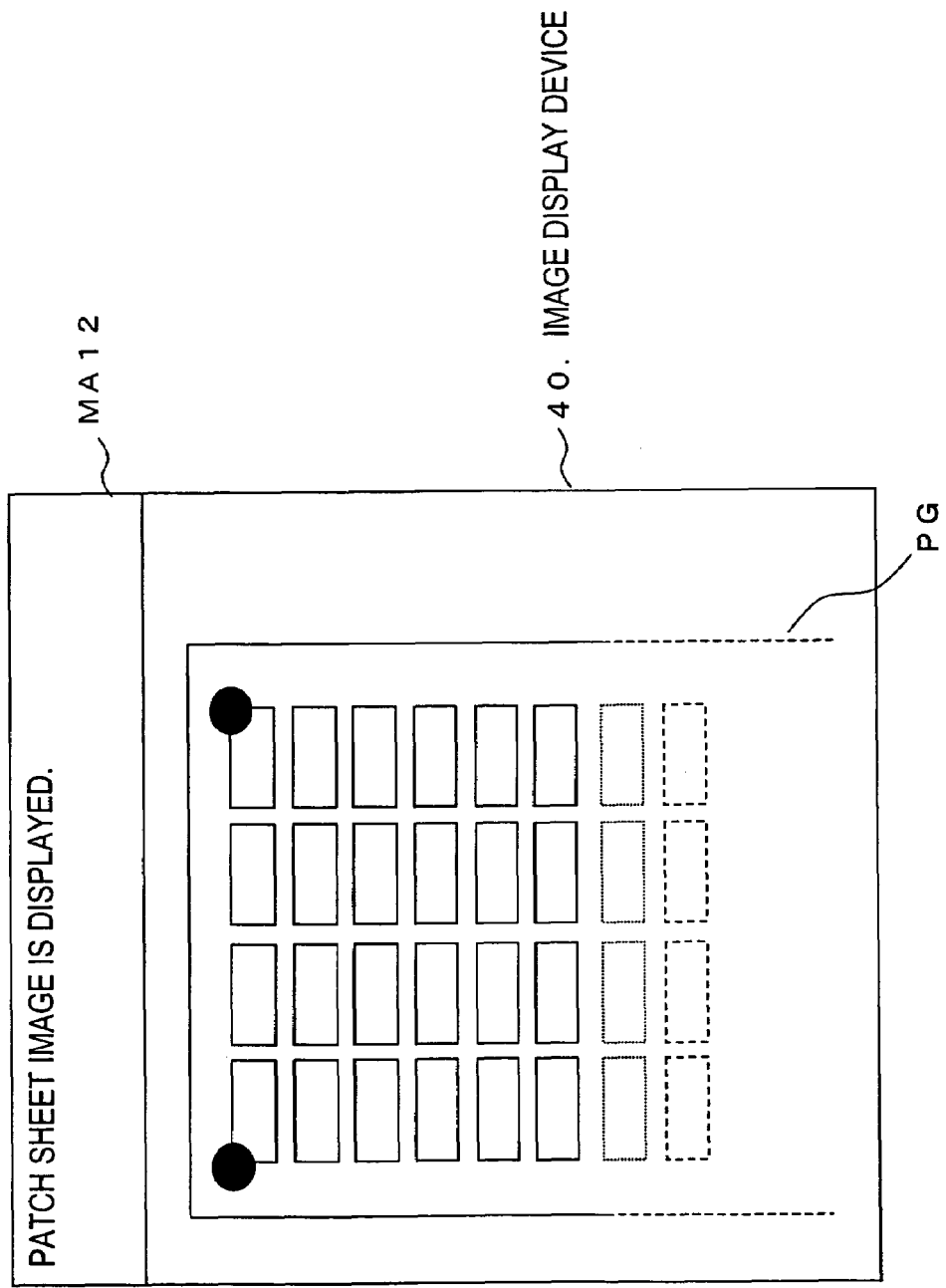
FIG. 6 shows an example of a display screen when the image display device 40 displays scanned image data.

First, the scanner 31 scans the patch sheet P-S and acquires the image data (RGB data of the respective pixels according to a predetermined resolution) in accordance with the color measurement instruction. The calibrator 14 reads the image data of the patch sheet P-S thus acquired (step S61) and displays the image data thus read on the image display device 40 (step S61). FIG. 6 shows an example of the display screen when the image display device 40 displays the image data. As shown in FIG. 6, a patch sheet image PG is displayed on the screen and the user is able to visually confirm the patch sheet P-S thus read. Further, a display region MA12 is provided in a position not overlapping the patch sheet image PG and the status of the processing such as 'patch sheet image is displayed in progress' can also be displayed. Thus, the user is able to grasp the progress status of the processing.

If the processing up until the display of the patch sheet image PG is to be described in detail, when read by the scanner 31, the image is represented by scanner RGB signals. The calibrator 14 that acquired the signals converts the signals into L*a*b* signals or XYZ signals that are not dependent on the device by using the color management function included in the OS and so forth, whereupon the signals are further converted into RGB signals for usage by the image display device 40 and the signals are output to the image display device 40.

After the patch sheet image PG has been displayed, the calibrator 14 detects the provisional patch pattern position (step S63). In this processing, for example, the image positions of the marker patches MP10 to MP30 which serve as references for the position of the patch sheet P-S are sensed and the positions of the patch patterns are detected based on the positional relationship with the marker patches. When definite positional detection is not possible, the default positions are made the provisional patch pattern positions, for example.

Figure 7A:
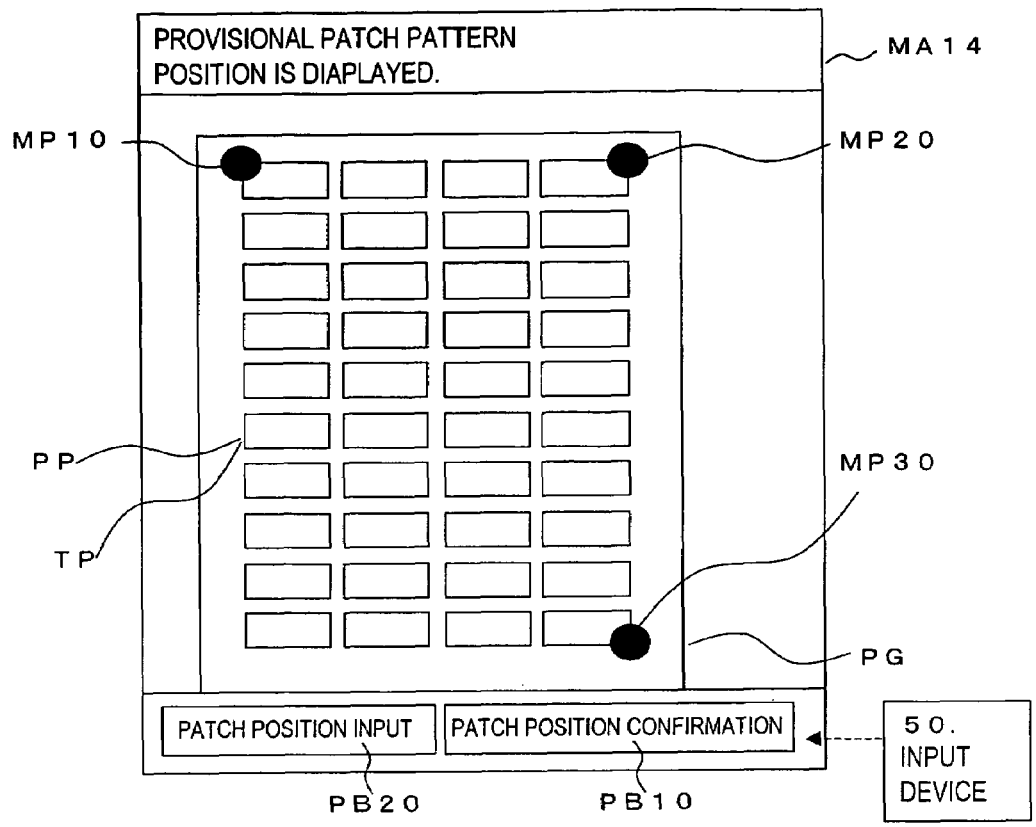
FIGS. 7A and 7B show examples of a provisional patch pattern position display screen displayed by an image display device 40.
Figure 7B:
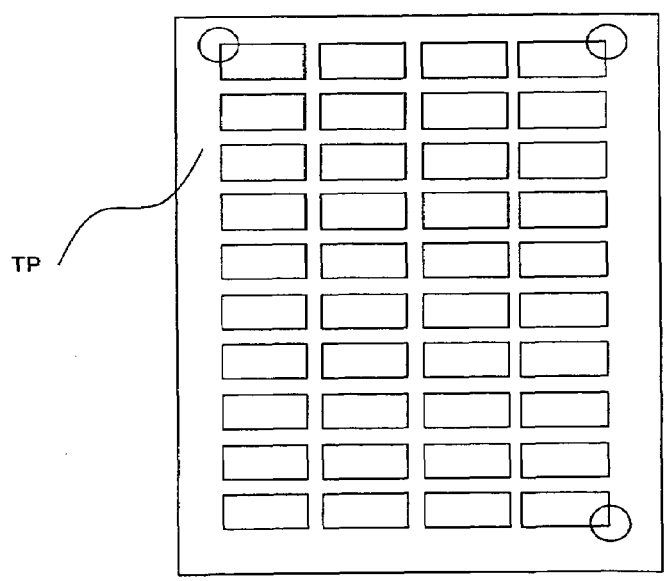

Thereafter, the calibrator 14 forms an image rendered by overlapping the detected provisional patch pattern position on the patch sheet image PG and displays the image on the image display device 40 (step S64). FIG. 7 shows an example of the provisional patch pattern position display screen displayed by the image display device 40. FIG. 7A shows this display screen. Here, a case is shown where the detection of the provisional patch pattern position is performed correctly and the image of the patch pattern PP of the patch sheet image PG matches the position of a provisional patch pattern position TP. Further, FIG. 7B shows only the provisional patch pattern position TP.

The processing to detect the provisional patch pattern position TP will be described once again by using FIG. 7. As described earlier, the marker patches MP10, MP20, and MP30 are generated from colors or gradation values that differ from those of the patch patterns and therefore the marker patches MP10 to MP30 are located by sensing images that conform to these colors or gradation values. Thereafter, because the images of the marker patches MP and the patch patterns are subject to a fixed positional relationship, the positions of the respective patch patterns are detected on the basis of the positions of the marker patches MP. Then, the provisional patch pattern position TP represented by the grating shape shown in FIG. 7B is generated, for example.

When the provisional patch pattern position display screen is displayed in this way, the user judges whether the provisional patch pattern position TP currently detected on the screen is correct (step S65). In other words, the user confirms whether the acquisition of the color measurement values of the respective patch patterns of the patch sheet P-S may be performed on the basis of the positions of the patch patterns detected (recognized) at the time.

When, as a result of this confirmation (judgment), the provisional patch pattern position TP is correct (YES in step S65) as per the case shown in FIG. 7A, the user orders (requests) the acquisition of the color measurement values of the respective patch patterns on the basis of the provisional patch pattern position TP (step S69). More specifically, the 'patch position confirmation' icon PB10 displayed at the bottom of the screen shown in FIG. 7A is clicked by using the input device 50.

On the other hand, when the provisional patch pattern position TP is incorrect (No in step S65), the user requests an input to correct the provisional patch pattern position TP in order to detect the correct positions (step S66).

Figure 8:
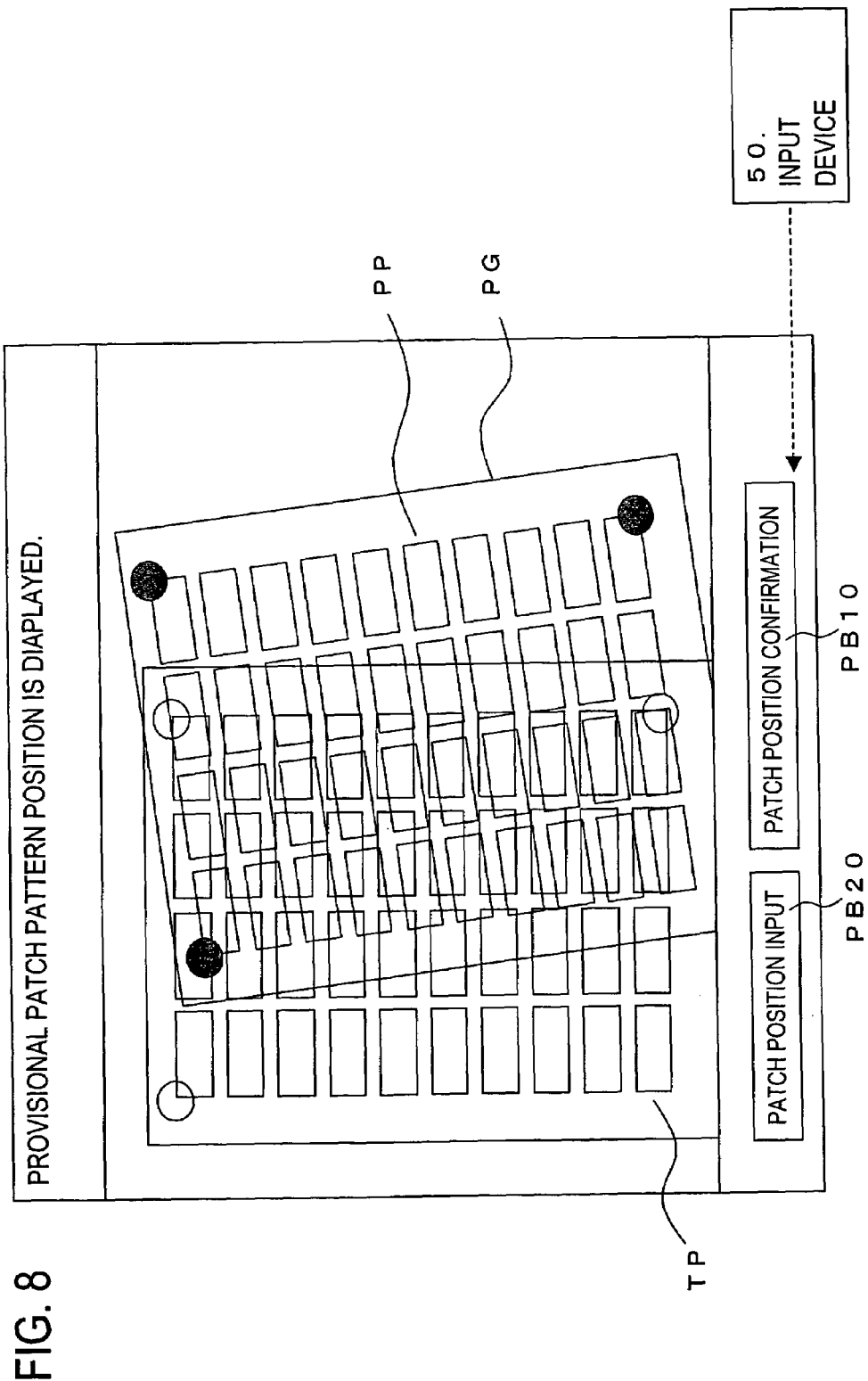
FIG. 8 shows an example of a provisional patch pattern position display screen when provisional patch pattern position detection has not been performed accurately.

FIG. 8 shows an example of a provisional patch pattern position display screen when provisional patch pattern position detection has not been performed accurately. In the illustrated example, the positions of the actual patch pattern PP and the provisional patch pattern position TP are displayed shifted with respect to one another and the user is able to easily confirm visually that the provisional patch pattern position has not been detected accurately. In this case, by clicking a 'patch position input' icon PB20 that is displayed at the bottom of the screen shown in FIG. 8 by using the input device 50, an input request for the correction is issued and the user issues an instruction to the calibrator 14 to start the patch pattern position input processing where the positions of the patch patterns are input manually.

Figure 9:
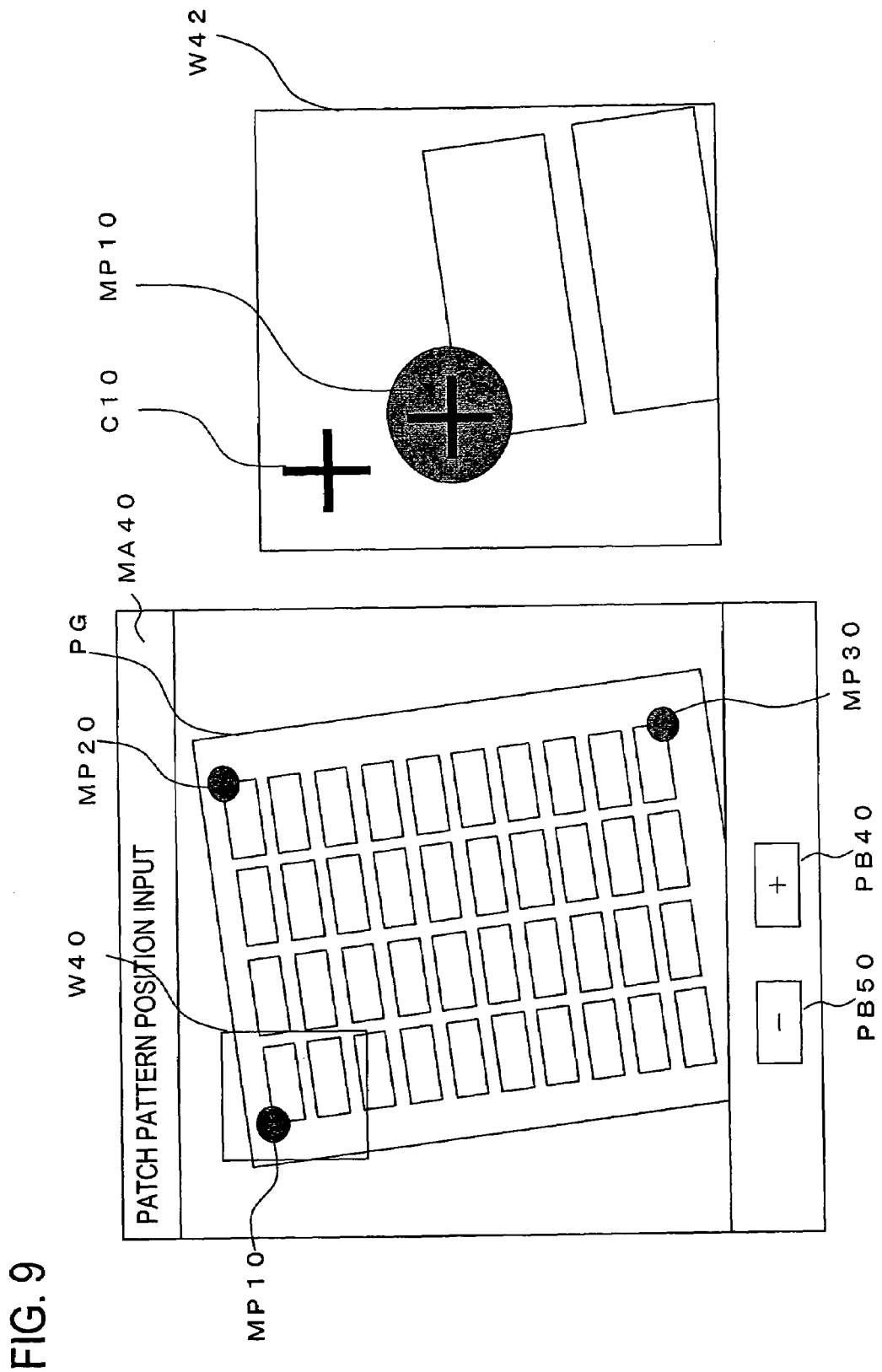
FIG. 9 shows an example of an input screen (patch pattern position input screen) when the user inputs a provisional patch pattern position.

Upon receiving this input request, the calibrator 14 displays the patch pattern position input screen on the image display device 40 (step S67). FIG. 9 shows an example of the input screen (patch pattern position input screen) in a case where the user inputs the provisional patch pattern position. The example in FIG. 9 represents a case where the calibrator 14 encourages the user to select, as a patch pattern position input, marker patches MP10, MP20, and MP30 that serve as references for the detection of the positions of the patch patterns on the basis of patch sheet image PG by the calibrator 14. In order that the marker patches MP10, MP20, and MP30 are easily identified on the patch sheet image PG via this screen, the patch sheet image PG is displayed only by an outline and the marker patches MP10, MP20, and MP30 are displayed in color. Furthermore, an instruction message encouraging the selection of marker patches can also be displayed in the display region MA40. By encouraging the selection of marker patches in this manner, inputs by the user are straightforward. Further, although marker patches are selected here, the positions of the patch patterns PP can also be input (selected) as a result of the user designating arbitrary points on the patch sheet image PG displayed by means of manipulation of the mouse or the like.

Thereafter, the user inputs patch positions on the input screen thus displayed (step S68). In the example shown in FIG. 9, to be accurate, the positions of the marker patches are input (selected). In this example, specifically speaking, a gridline W40 for selecting marker patches that constitute a reference for position detection on the patch sheet image PG is first moved through manipulation of the mouse and the position of the gridline W40 is then fixed by means of a mouse click at the stage where the targeted marker patch MP10 is captured within the gridline.

Thereafter, the image within the area of the gridline W40 is displayed enlarged on a separate screen W42, which is different from the screen displaying the patch sheet image PG. As a result, because the user is able to simultaneously confirm both the overall positional relationship of the patch sheet image PG and an image having an enlarged selected target range, the operation can be executed smoothly and the marker patch position selection can be performed accurately. Further, by clicking the mouse on the '+' icon PB40 and '−' icon PB50 displayed at the bottom of the screen, adjustment of the display magnification in the gridline W42 can be performed.

Thereafter, the user moves the cursor C10 within the area of the screen W42 by means of the mouse and clicks with the mouse at the point where the position of the marker patch MP10 and the position of the cursor C10 overlap. As a result of this operation, the marker patch MP10 is selected and the position thereof is input to the calibrator 14. By selecting the marker patches MP20 and MP30 by means of a similar operation, the correct positions of the three marker patches MP can be input to the calibrator 14.

When the above input processing is performed, the calibrator 14 detects the positions of the patch patterns PP in predetermined positional relationships from the positions of the marker patches thus input and determines the provisional patch pattern positions based on the detection results (step S63), and once again displays the provisional patch pattern position TP and the patch sheet image PG on the image display device 40 such that same are overlapping (step S64).

Thus, until it is judged by the user that the provisional patch pattern position TP is correct (Yes in step S65), the provisional patch pattern position TP is redetected and redisplayed based on the user input.

Then, if it is confirmed that the provisional patch pattern position TP is correct (Yes in step S65), as mentioned earlier, the acquisition of the color measurement values of the respective patch patterns is instructed (requested) on the basis of the provisional patch pattern position TP (step S69). The calibrator 14 that receives the request first determines the patch pattern position from the interim patch pattern position TP at this point in time and displays the patch pattern position determination screen on the image display device 40.

Figure 10:
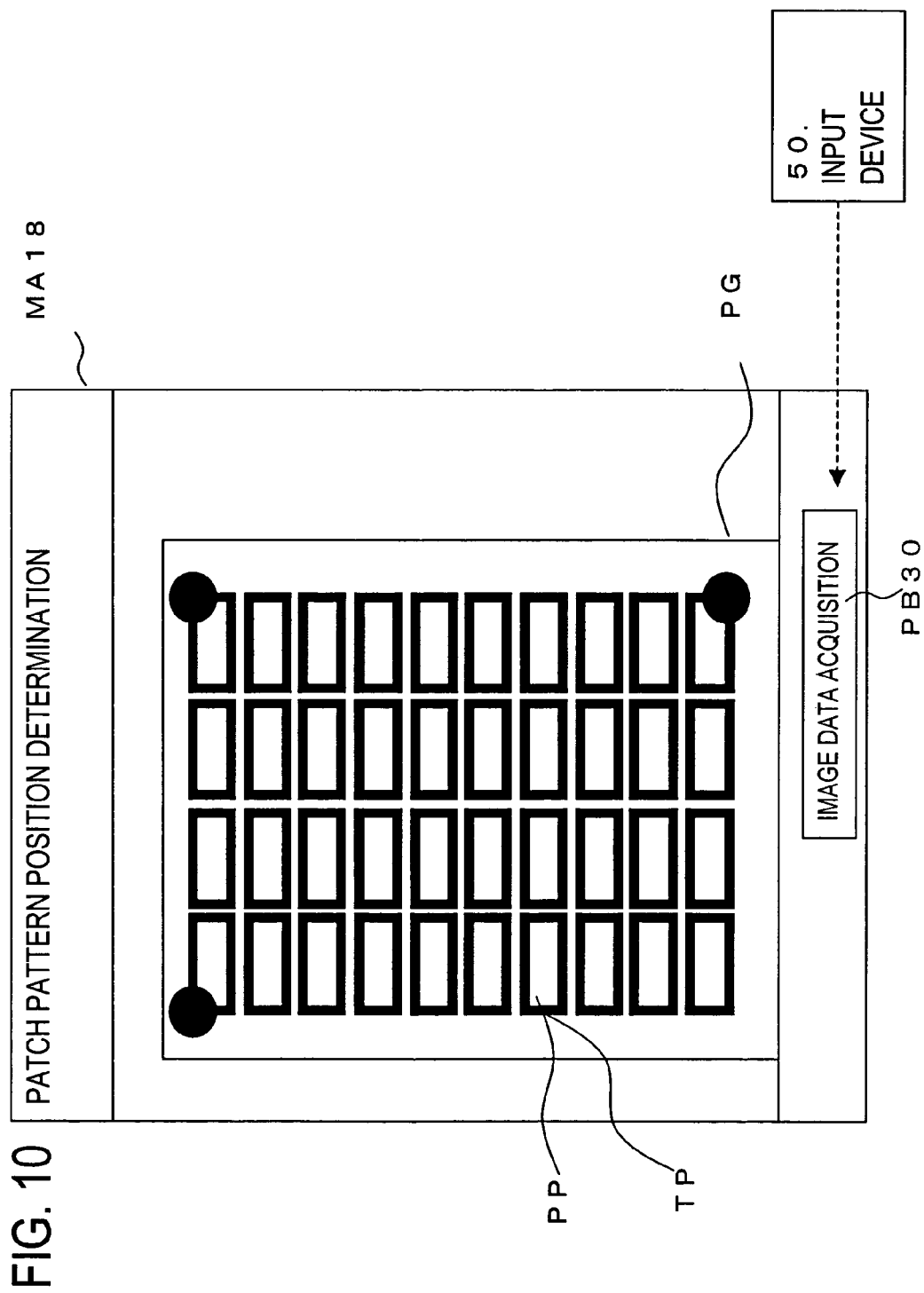
FIG. 10 exemplifies a patch pattern position determination screen.

FIG. 10 exemplifies the patch pattern position determination screen. As shown in FIG. 10, the determined patch pattern position (outline of the respective patch patterns) is displayed with a bold line on this screen. As a result, the user is able to confirm that the patch pattern position has been determined. Further, a display region MA18 may be provided in a region that does not overlap the patch sheet image PG in the screen and the content of processing such as 'patch pattern position determination' may be displayed.

Further, the acquisition of the color measurement values of the respective patch patterns is instructed by clicking the 'patch position confirmation' icon PB10 on the screen shown in FIG. 7 as mentioned earlier, but the user may also issue an instruction for the acquisition of the color measurement values after reconfirming the position via the patch pattern position determination screen. In such a case, the user instruction is issued by clicking the 'image data acquisition' icon PB30 that is displayed at the bottom of the screen shown in FIG. 10.

Thereafter, the calibrator 14 acquires the color measurement values of the respective patch patterns of the patch sheet P-S on the basis of the determined positions. More specifically, in the case of image data of the patch sheet P-S supplied by the scanner 31, one measurement value (RGB value) is acquired for each patch on the basis of the RGB values of the respective pixels thus located in the determined positions of each patch, that is, within the area of each determined patch (step S70). Here, averaging processing that is to acquire the average value of the RGB values of a plurality of pixels that exist within the area of each patch as one measurement value (RGB value) that represents the patch is performed. Further, the plurality of pixels may be all the pixels that exist within the area of each patch or averaging may be performed from the RGB values of a predetermined number of pixels within the area. When averaging is performed from the RGB values of a predetermined number of pixels within the area, the pixels located at the center of the patch are desirably selected.

Figure 11:
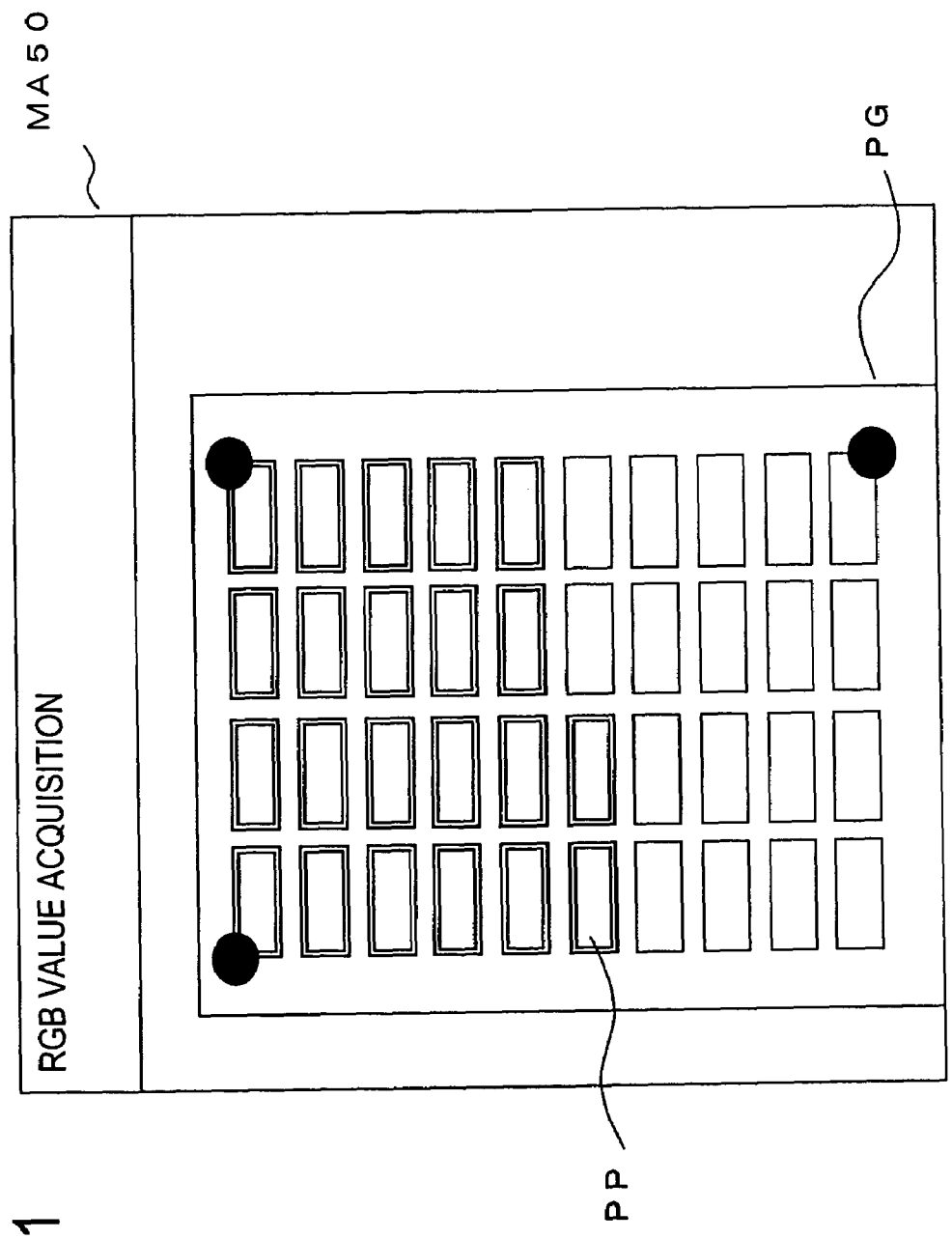
FIG. 11 shows an example of a screen that is displayed on the image display device 40 by a calibrator 14 during color measurement value acquisition processing.

FIG. 11 shows an example of a screen that the calibrator 14 displays on the image display device 40 during the processing to acquire the color measurement values. The example shown in FIG. 11 represents a case where the acquisition of color measurement values (RGB values) is complete for patch patterns the outline of which is displayed using a double line and the processing is incomplete for patch patterns displayed using a single line. As a result of such a display, the user is able to grasp the state of progress of the processing. Further, a display region MA50 is provided on this screen in a region that does not overlap the patch sheet image PG and the content of the processing may be displayed as 'RGB value acquisition' or the like.

Thereafter, the calibrator 14 performs processing that converts the acquired color measurement values into L*a*b* values (step S71). As described earlier, the acquired color measurement values are RGB signals for use by the scanner 31 and, therefore, in order to be compared with the standard data 17, the acquired color measurement values are converted by means of a predetermined function into L*a*b* values that do not depend on the device.

Figure 12:
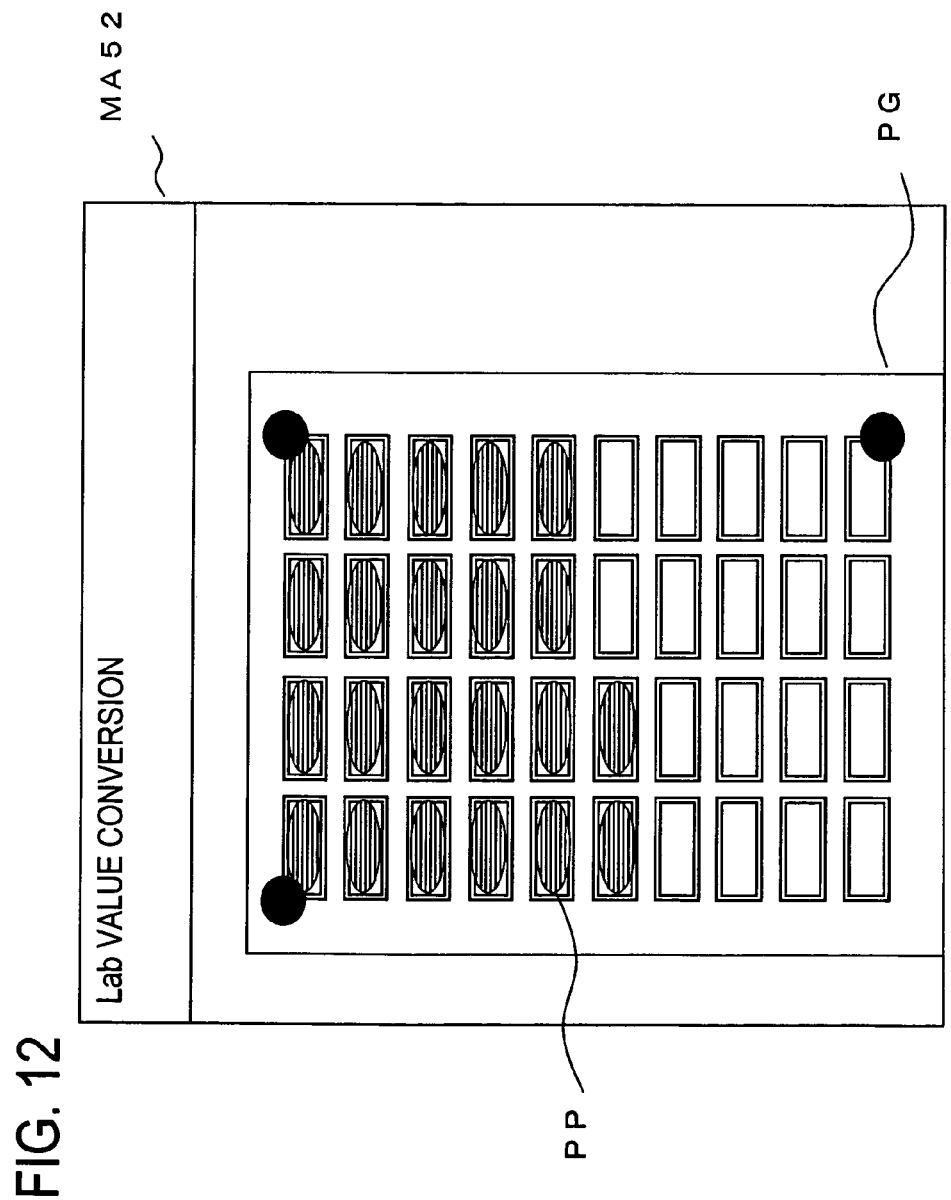
FIG. 12 shows an example of a screen that is displayed on the image display device 40 by the calibrator 14 during Lab conversion processing.

FIG. 12 shows an example of a screen that the calibrator 14 displays on the image display device 40 during the conversion processing. In the example shown in FIG. 12, an elliptical icon of a different color from the patch pattern is displayed overlapping the patch pattern at the point when the conversion to L*a*b* values is complete for each of the patch patterns, whereby the state of progress of the processing can be grasped by the user. Further, a display region MA52 may be provided in a region that does not overlap the patch sheet image PG and the content of the processing such as 'Lab value conversion' may be displayed.

In this way, color measurement values when the color measurement device is the scanner 31 are acquired (S60) and, in this case, the L* value, a* value, and b* value are also acquired for each of the patches (any of the colors of CMYK and the gradation values thereof). Four-dimensional information including the gradation value, L* value, a* value, and b* value can be acquired for each of the CMYK colors. Further, when the color measurement device is the scanner 31, because the RGB values (averaged values) of the color measurement results are also used when generating the color correction table 18 in comparison with the standard data 17 as will be described subsequently, the RGB values are held instead of being erased even after the L*a*b* value conversion.

Thereafter, returning now to FIG. 4, when the calibrator 14 thus acquires the respective color measurement values of the patch pattern PP, because their values (L*a*b* values) are data for gradation values ('7', '14', '21', ... as shown in FIG. 3, for example) which are values scattered at predetermined intervals for each of the CMYK colors, color measurement value interpolation processing is performed in order to determine also color measurement values (L*a*b* values) that correspond with the respective gradation values between these gradation values (step S90).

In this interpolation processing, the respective relationships between each of the CMYK colors and each of the values of L*, a*, and b* are approximated by means of a higher order polynomial on the basis of the acquired color measurement values and the color measurement values for all the respective gradation values of all the gradations (0 to 255) are determined by the higher order polynomial. For example, for the color C, the relationship (function) between the gradation value of C and the value of L* is approximated by means of a higher order polynomial from the color measurement results for the respective C patches. Likewise, the relationship (function) between the gradation value of C and the value of a* and the relationship (function) between the gradation value of C and the value of b* is approximated by means of a higher order polynomial. Further, the order of the function need not be determined as long as the function is one that permits highly accurate interpolation of the respective L* values, a* values and b* values that correspond with the respective gradation values. Thus, the gradation difference of the color values (L*a*b* values or the like) is optimally approximated to the gradation difference of the color densities of the patch pattern PP that can be identified with the naked eye. Accordingly, by interpolating the color values that correspond with the gradation values that have not been measured on the basis of the measured color values as mentioned earlier, the natural continuity in the output densities of the colors of the gradation corresponding with the interpolated color values can be confirmed with the naked eye.

Figure 13:
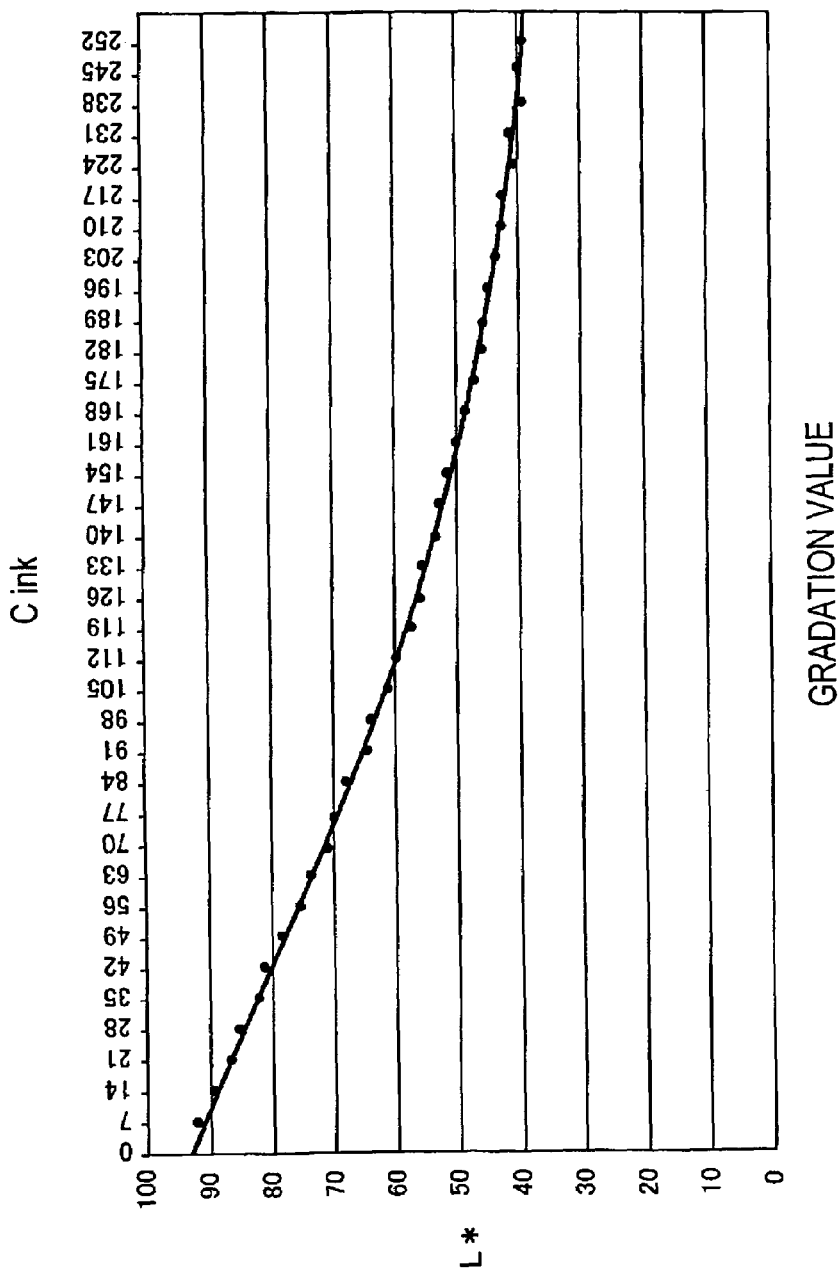
FIG. 13 exemplifies a function to derive L* values for C ink.
Figure 14:
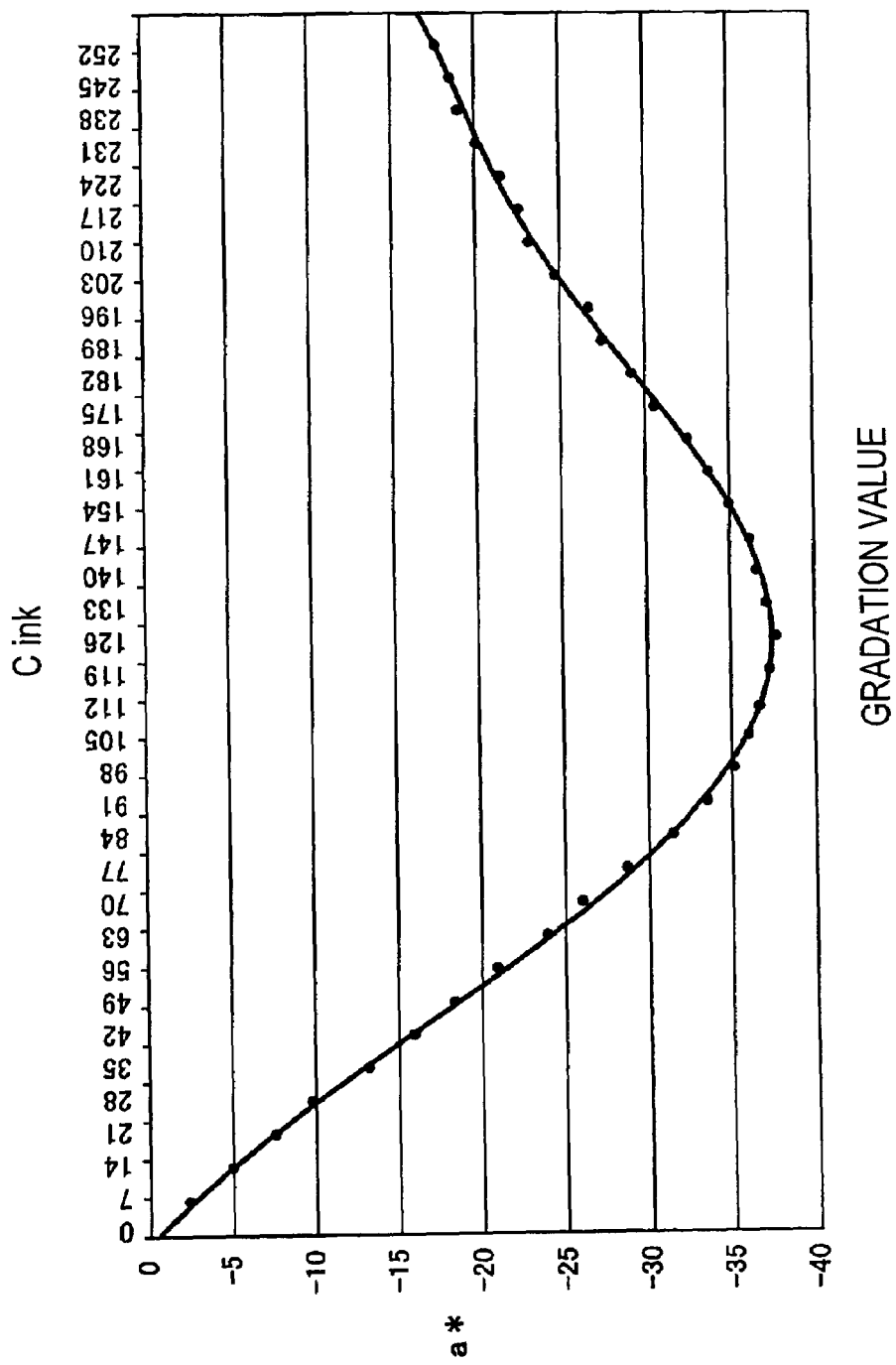
FIG. 14 exemplifies a function to derive a* values for C ink.
Figure 15:
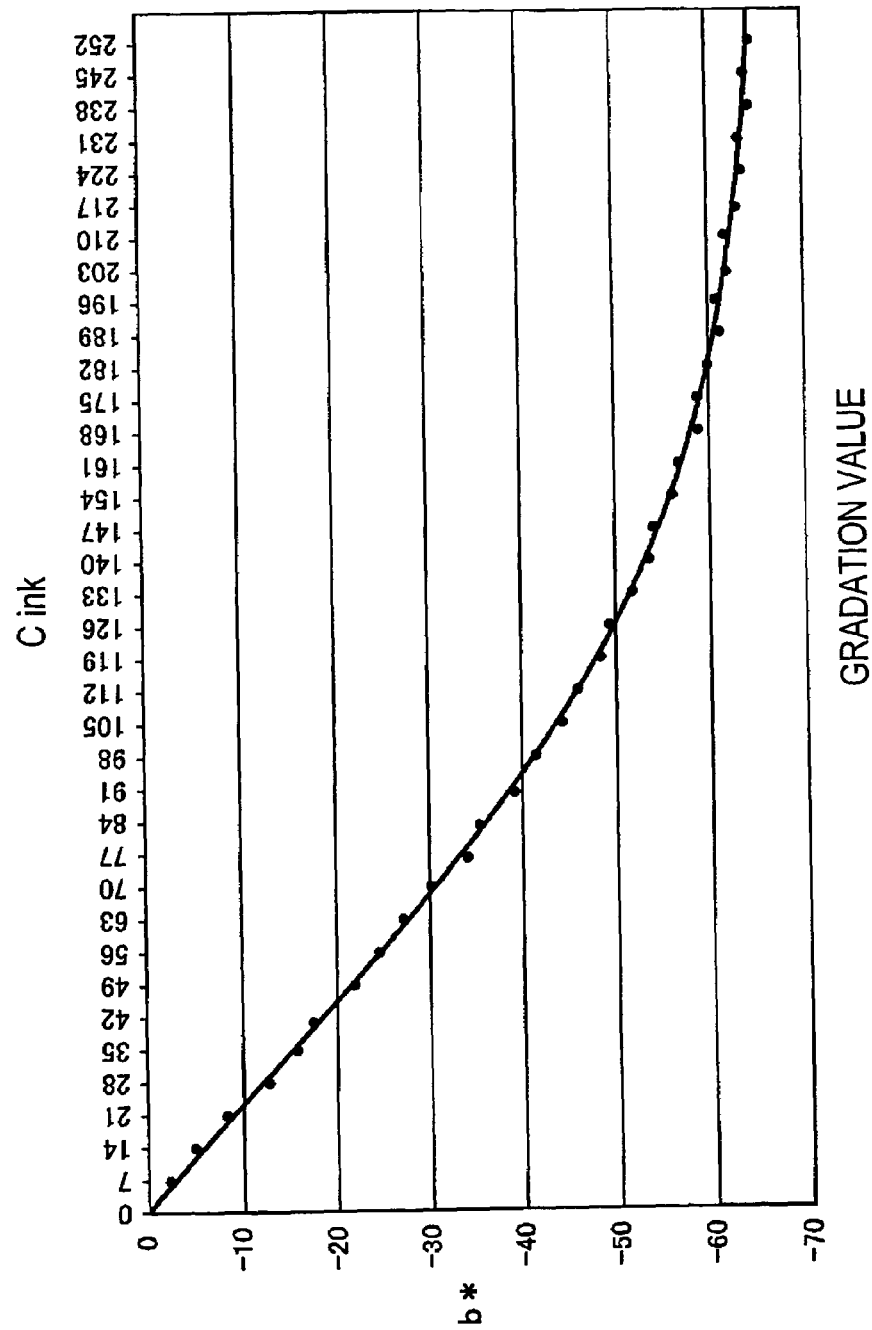
FIG. 15 exemplifies a function to derive b* values for C ink.

FIGS. 13 to 15 show graphs produced by functions by which the L* values, a* values, and b* values are introduced, that is, by the respective higher order polynomials, with C (cyan) ink taken as an example. In these drawings, the horizontal axis represents the gradation value of C (cyan) of the patch pattern PP and the vertical axis represents the L* value, a* value, and b* value respectively. The black circles in the drawings represent the color values of the patches acquired through color measurement. Here, the respective higher order polynomials are found as approximation equations that plot curves that minimize the sum of the squares of the distances from each of the plotted color values (black circles).

In addition, when the higher order polynomials are determined, some of the color values among the referenced color values (color measurement values) may be calculated with a weighting. Here, the weighting of a certain color value is performed by assuming that a plurality of the same color values exist instead of one in the color spaces L*a*b*. That is, because the higher order polynomial is determined to describe a curve for which the sum of the squares of the distances from the respective color values is minimum, when a certain color value is weighted, a higher order polynomial is determined to describe a curve that passes closer to the coordinates of the color values in order to minimize the square sum. For example, if the color values corresponding with the highest gradation value and lowest gradation value are weighted, an interpolated curve that passes closer to the coordinates of the color values corresponding with the highest gradation value and lowest gradation value is described. As a result, the respective color values are strictly interpolated depending on the output color characteristic of the printer 20 in the vicinity of the two gradation values.

Thus, there are cases where it is empirically recognized that the curve described by the higher order polynomial mentioned above includes points of large deviation. When these different values are detected, a drop in interpolation accuracy can be prevented by switching the interpolation means in the vicinity of gradation value for which the different value is detected with spline interpolation or linear interpolation, for example.

Furthermore, when performing the above-mentioned interpolation, the calibrator 14 sometimes performs the correction (ground color correction) based on the ground color of the paper medium or the like that the patch sheet P-S is printed on (step S80). This ground color correction is executed when the ground color of the paper the patch sheet P-S is printed on is more concentrated than the expected ground color of a standard sheet. In this case, in the patches of the patch pattern PP where the densities are low, that is, have low gradation values, because errors are contained in measured color values, receiving the effect of ground color particularly, ground color correction is executed in order to correct such errors.

More specifically, because the color value resulting from color measurement from a patch with a gradation value of '0' contained in the patch sheet P-S is the ground color, this color value is compared with the threshold value recorded in the ground color threshold value table 19. Then, if the color value is equal to or more than the threshold value, corrections are applied to the color measurement values of each patch on the basis of the color values resulting from color measurement from the patch with a gradation value of '0'. For example, for a patch with a relatively small gradation value, the correction that involves subtracting color measurement values for a patch with a gradation value of '0' from the color measurement values of the patch is performed. Further, when this subtraction is performed, the subtracted value is reduced as the gradation value of the patch increases. After performing such color measurement value correction, the abovementioned higher order polynomial is determined based on the each of the corrected color measurement values and interpolation is executed. Further, the correction of the color measurement values may be performed for all the color-measured patches.

Thus, in the case of the calibrator 14 of this embodiment, all or some of the color measurement values of the respective patches are weighted on the basis of various conditions when an approximation equation is determined from the color measurement values of each patch.

Thus, after acquiring the color values (color measurement values) corresponding to all the gradation values through highly accurate interpolation, the calibrator 14 compares the acquired color measurement results and the earlier-mentioned standard data 17 and generates the color correction table 18 based on the result of the comparison (step S100). As mentioned earlier, the standard data 17 are data indicating the densities (color values) that are actually to be output for the respective gradation values of the image data and are data in the same format as that of the constructed correspondence relationship between the gradation values and color values (color measurement values). Therefore, the color measurement results and standard data 17 can be compared and, on the basis of the comparison, the calibrator 14 generates the color correction table 18 that corrects the respective gradation values so that printing is performed by means of the target values indicated by the standard data 17 for the respective gradation values of each of the colors.

Figure 16:
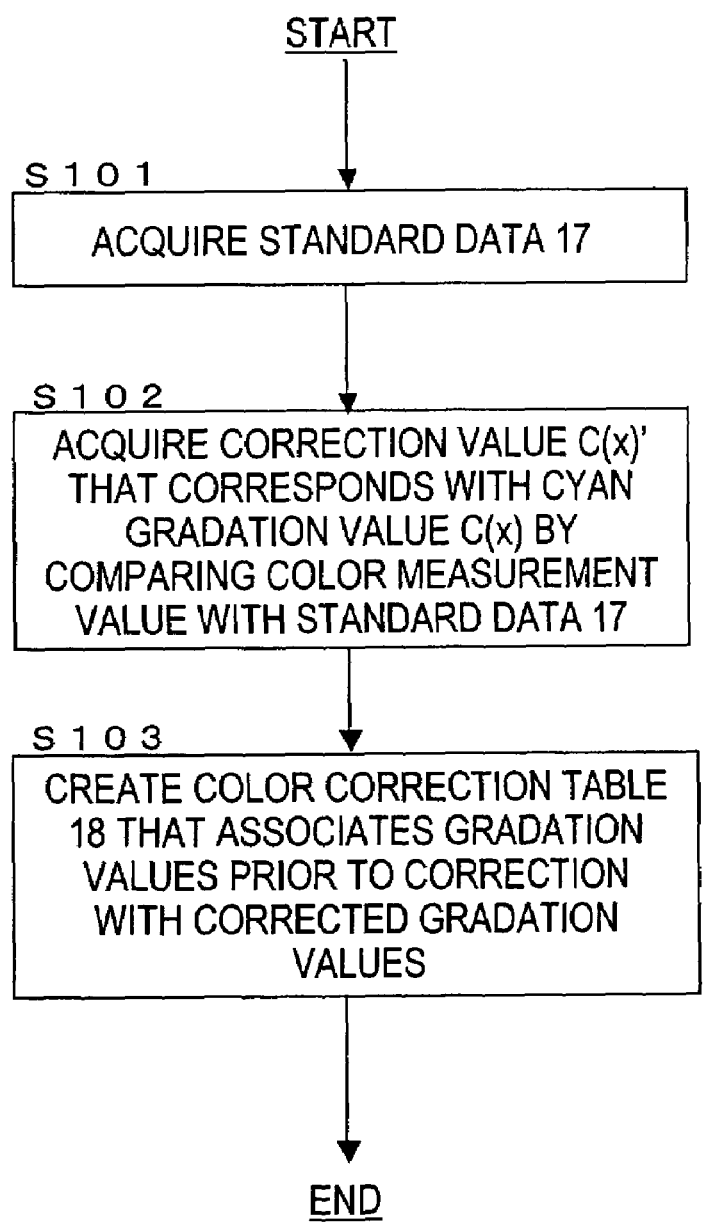
FIG. 16 is a flowchart that exemplifies the processing procedure for generating the color correction table 18.

More specifically, processing is performed as shown below. FIG. 16 is a flowchart that exemplifies the processing procedure for generating the color correction table 18. First, the calibrator 14 acquires the standard data 17 from a predetermined storage location (step S101). The interpolated color measurement value data are then compared with the standard data 17. The color measurement value data are made up of three-dimensional information (L*a*b* values) for the respective gradation values for each of the colors (CMYK) as exemplified by FIGS. 13 to 15. Hence, the data are represented as a curve L1 in a three-dimensional space formed by L*, a*, and b* for each color. Likewise, the standard data 17 are also represented as a curve L2 in the same space.

In this state, the gradation value for which the corrected gradation value is to be determined is decided. For example, the gradation value x for C (C(x)) is decided and the point on curve L1 that is closest to the point on curve L2 which corresponds with C(x) (where color difference ΔE is minimum) is detected. The gradation value C (x)' that corresponds with the detected point is then determined (step S102). This C(x)' is the targeted corrected gradation value and the same processing is performed for all the gradation values, namely C(0) to C(255), for example. The same processing is also performed for other colors.

Figure 17:
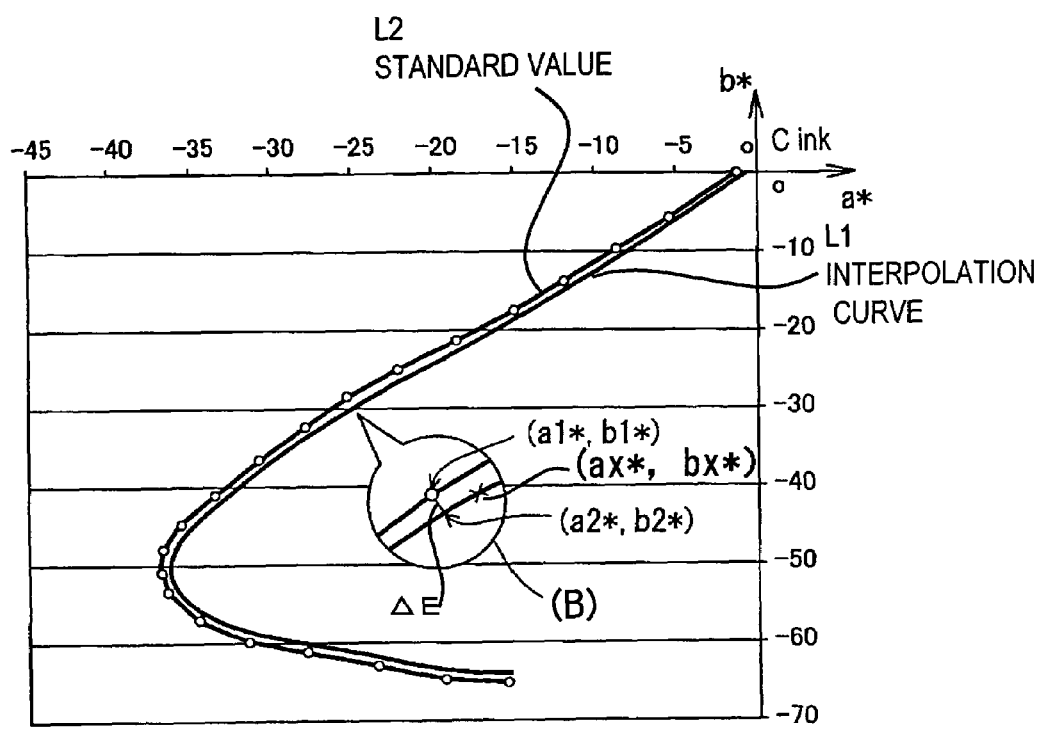
FIG. 17 serves to illustrate processing to acquire a corrected gradation value.

FIG. 17 serves to illustrate processing to acquire the corrected gradation values. In FIG. 17, the three-dimensional space formed by the L*, a*, and b* is represented as a two-dimensional space formed by a* and b* to facilitate understanding. FIG. 17 represents curve L1 of the interpolated color measurement values and curve L2 of the standard data 17 on the same a*b*plane. That is, the L*a*b* values in the L*a*b* color space which is a three-dimensional space are projected onto a*b*plane. The standard data are plotted with white circles on the standard value curve L2 but an illustration of the standard values corresponding with all the gradation values is omitted and only some values are shown by white circles. When a color shift is not produced from the print results of the standard printing device, the interpolation curve L1 is identical with standard value curve L2. However, when a color shift occurs in the print results between the standard printing device and printer 20, the interpolation curve L1 and standard value curve L2 are displaced on a*b*plane as shown in FIG. 17.

Enlarged view (B) in FIG. 17 uses a white circle and a × sign to represent color values acquired from the print results when printing is performed based on the same gradation value data by the standard printing device and printer 20. Supposing that this gradation value is C(x), a point on the interpolation curve L1 corresponding with C(x) is (ax*, bx*) and a point on the standard value curve L2 corresponding with C(x) is (a1\*, b1\*). Further, it can be seen that the point on the interpolation curve L1 for which the color difference ΔE from (a1\*, b1\*) on the standard value curve L2 is minimum is (a2\*, b2\*) and that there is a shift between (ax*, bx*) and (a2\*, b2\*) on the interpolation curve L1. This means that a color shift has occurred and that C(x) should be changed to a gradation value corresponding with (a2\*, b2\*).

FIG. 18 serves to illustrate processing to acquire the corrected gradation value C(x)' from the original gradation value C(x). The table shown in FIG. 18 associates the cyan gradation value C(x), the color value on the interpolation curve L1, and the color value on the standard value curve L2. The left-hand column of the table is provided with a minimum value 0 to a maximum value 255 for the cyan gradation value C(x), the center column is provided with the minimum value (a(Min)*, b(Min)*) to the maximum value (a(Max)*, b(Max)*) of the color value on the interpolation curve L1, and the right-hand column is provided with a minimum value (a(Min)*, b(Min)*) to the maximum value (a(Max)*, b(Max)*) of the color value on the standard value curve L2. The color value on the interpolation curve L1 and the color value on the standard value curve L2 correspond with the same cyan gradation value. The content described by enlarged view (B) of FIG. 17 will be explained below based on this table.

First, the color value (aX*, bX*) on interpolation curve L1 and the color value (a1\*, b1\*) on standard value curve L2 exist in correspondence with cyan gradation value C(x). In this table, (aX*, bX*) and (a1\*, b1\*) correspond to the same row. However, the standard color value (a1\*, b1\*) is shifted with respect to the measured color value (aX*, bX*). Therefore, the color value (a2\*, b2\*) on interpolation curve L1 that is closest (where color difference ΔE is minimum) to the standard color value (a1\*, b1\*) is detected. The cyan gradation value C(x)' corresponding with detected value (a2\*, b2\*) is then obtained. That is, if the gradation value C(x) is corrected to C(x)', the color value (a2\*, b2\*) that is approximated to the standard value (a1\*, b1\*) can be reproduced through printing by the printer 20.

Thus, once the corrected gradation value C(x)' is acquired for all the C (cyan) gradation values, the color correction table 18 that associates the gradation values prior to correction with the corrected gradation values is created (step S103).

The processing to acquire C(x)' calculates the gradation value C(x)' for outputting, by means of printer 20, the same output color as an approximation value to the output color that is output by the gradation value C(x) of a standard printing device. Hence, if the correspondence relationship in which the calculated gradation value C(x)' is the corrected gradation value and the above-mentioned gradation value C(x) is the gradation value before correction is decided, the color correction table 18 for C that allows color shifts to be corrected highly accurately can be created. Accordingly, by performing the same processing for all the ink colors, the color correction table 18 can be created for all colors.

Finally, the calibration processing ends as a result of updating the existing color correction table 18 by means of the created color correction table 18.

Figure 19:
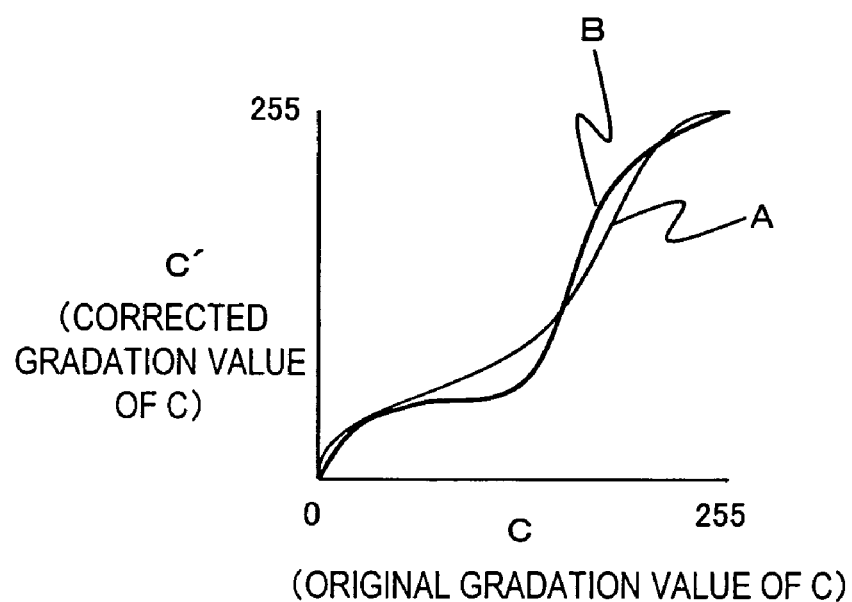
FIG. 19 serves to illustrate an update of the color correction table 18.

FIG. 19 serves to illustrate the update of the color correction table 18. FIG. 19 represents the color correction table 18 for the color C by means of a graph as per the case of FIG. 2, wherein the horizontal axis represents the original gradation value of C (C) and the vertical axis represents the corrected (converted) gradation value of C (C'). Further, curve A in FIG. 19 shows the relationship between C and C' according to the original color correction table 18 and curve B represents the relationship between C and C' according to the currently updated color correction table 18.

Thus, because a new color correction table 18 is generated and stored in a predetermined location, during subsequent printing, the currently updated color correction table 18 is used in the color correction processing (CMYK data→C'M'Y'K' data) (curve B is used in the example in FIG. 19) and printing with the appropriate standard value is performed until the density characteristic of the printer 20 is changed.

Further, when the scanner 31 is selected as the color measurement device (S40), processing may be performed based on data rendered by adding RGB values to the L*a*b* values constituting the color measurement values mentioned earlier in the abovementioned processing to interpolate the color measurement values (S90) and generate the color correction table 18 (S100).

More specifically, when the above processing is performed for the each of the CMYK colors, the L*a*b* values and any of the RGB values in a complementary color relationship with the object colors are used. When the processing object is C, the L*a*b* values and R value are used. When the processing object is M, the L*a*b* values and G value are used. When the processing object is Y, the L*a*b* values and B value are used. When the processing object is K, the L*a*b* values and (R+G+B/3) value are used.

More specifically, when the processing of C is described by way of example, because the color measurement values of each patch are acquired as RGB values at the stage of acquiring the color measurement values (S60), same are converted into L*a*b* values, whereupon interpolation processing using the abovementioned higher order polynomial is performed on the respective L*a*b* values, in addition, the relationship of the gradation value for C with respect to the R value is approximated by means of the same higher order polynomial, and the same interpolation processing is performed between patches.

As a result, four-dimensional information of the L* value, a* value, b* value and R value is acquired for gradation values for C and, at the time the color correction table 18 is generated, data for R of the standard data 17 is also used and the color measurement value and standard value are compared in a four-dimensional space produced by L*, a*, b*, and R. As a result of the comparison, the corrected gradation value C(x)' for C(x) is acquired by means of the same processing as the processing for the abovementioned three-dimensional space and two-dimensional space, and a new color correction table 18 for C is generated. A new color correction table 18 is also generated by means of the same method for the other colors.

In this embodiment, color correction processing that performs correction prior to executing printing to output the gradation values of an original image in appropriate densities is performed on expanded CMYK data which are toner colors used by the printer 20. However, the timing with which the color correction processing is performed is not limited to such timing. Color correction processing may also be performed on RGB data prior to color conversion processing, or in conjunction with the color conversion processing (RGB data→CMYK data). In the latter case, the color correction table 18 may be contained in the color conversion table 15. That is, the color conversion table 15 may be corrected so as that if an arbitrary gradation value in an RGB color space is input, the gradation value for image data in a CMYK color space corrected based on the output color characteristic of the printer 20 can be obtained.

Furthermore, although the color correction table 18 is on the host computer 10 side in this embodiment, the color correction table 18 may also be on the printer 20 side. In such a case, the printer driver 12 of the host computer 10 transmits CMYK data prior to color correction and color correction processing is performed by the control unit 22 of the printer 20. The above-mentioned calibration processing, which has been mainly controlled by the calibrator 14, is performed in the same way in this case.

Furthermore, although CMYK used by the printer 20 and the RGB used by the scanner 31 and L*a*b* values and so forth are used as color representation methods in this embodiment, the present invention is not limited to this color representation method. The gradation values of print data and the actual measurement densities of output may also be represented by other methods.

As described earlier, in the case of the calibration system 1 according to this embodiment, a common patch sheet P-S is used irrespective of which device is selected as the color measurement device used during the calibration. Therefore, there is no need to prepare data for a plurality of patch sheets and, even when the color measurement device is changed and undecided, a patch sheet P-S that has already been output is not worthless.

In addition, the interpolation processing to obtain correction information for all the gradation values from the color measurement results for intermittent gradation values is performed at the stage of the color measurement values (color values) represented as information of a plurality of dimensions and the comparison with the standard data 17 in order to acquire corrected gradation values is made on the basis of information of a plurality of dimensions. Hence, highly accurate calibration is possible and, even when a scanner 31 or the like of low color measurement accuracy is selected as the color measurement device and a common patch sheet P-S is used, the quality of the calibration can be maintained.

In addition, when the scanner 31 is selected as the color measurement device, a confirmation step by the user is provided in the patch pattern position detection that is essential to the color measurement value acquisition and detection of the patch pattern position that is more accurate than conventional detection is executed. The quality of the calibration can also be maintained in this respect.

Further, when the scanner 31 is selected as the color measurement device, the color measurement values of the respective patches are determined by the abovementioned averaging in the acquisition of color measurement values, whereby the high quality of the calibration can also be maintained.

Furthermore, when the scanner 31 is selected as the color measurement device, the above comparison with the standard data 17 can also be performed on the basis of information of a higher number of dimensions. In this case, the accuracy improves further and the high quality of the calibration can also be maintained in this respect.

Moreover, because a higher order polynomial is used in the interpolation processing of the color measurement values and various weighting processing performed by means of ground color correction or the like is implemented at the time the higher order polynomial is determined, more accurate calibration is possible.

Thus, irrespective of which device is selected in a network environment in which a plurality of color measurement devices of varying accuracy are used, the calibration system 1 of this embodiment allows efficient calibration to be performed at a high level of quality without complications even when a device of low color measurement accuracy is selected.

What is claimed is:

1. A calibration system, comprising:
an image formation unit that outputs a patch sheet having a plurality of patch patterns based on different gradation values for each color of color material that is used;
a selection unit that receives an instruction to select a device from among a plurality of color measurement devices comprising a first color measurement device and a second color measurement device of a lower color measurement accuracy than that of said first color measurement device;
a color measurement unit that receives color measurement result data for said patch sheet that is color-measured by said color measurement device selected by said selection instruction;
a color measurement value determination unit that acquires color measurement values for each of said patch patterns on the basis of said received color measurement result data; and
a color adjustment unit that determines, for each of said colors of the color material, color measurement values for all the possible gradation values on the basis of each of said acquired color measurement values and said gradation values of the respective patch patterns corresponding with each of said color measurement values, and generates color correction information of said image formation unit by comparing the determined color measurement values with predetermined standard values,
wherein said output patch sheet is common irrespective of said color measurement device selected by said selection instruction;
when said first color measurement device is selected by said selection instruction, said color adjustment unit represents said color measurement values determined for all the gradation values by means of information of a first color space that differs from the color space of said color material, and compares said color measurement values with said standard values in a three-dimensional space; and,
when said second color measurement device is selected by said selection instruction, said color adjustment unit represents said color measurement values determined for all the gradation values by means of information of said first color space and information of a second color space that differs from the color space of said color material and said first color space, and compares said color measurement values with said standard values in a four-dimensional space; and wherein the first color space is L*a*b* and the second color space is any one of R, G or B.

2. The calibration system according to claim 1, wherein said color adjustment unit approximates the relationship between said gradation values and said color measurement values by means of a higher order polynomial from said acquired respective color measurement values and said gradation values of the respective patch patterns corresponding with said acquired respective color measurement values and determines said color measurement values for all the gradation values by means of said higher order polynomial.

3. The calibration system according to claim 2, wherein, when said higher order polynomial is determined, said color adjustment unit performs weighting on some or all of said acquired color measurement values.

4. The calibration system according to claim 3, wherein said color adjustment unit performs said weighting on the basis of the color measurement value that corresponds with the ground color of said patch sheet.

5. The calibration system according to claim 3, wherein said color adjustment unit performs said weighting on the color measurement values of said patch patterns that correspond with a maximum gradation value and a minimum gradation value.

6. The calibration system according to claim 1, wherein color correction processing by said color correction information is performed in conjunction with processing to convert the color space of image data for the execution of image formation by said image formation unit into the color space of said color material.

7. The calibration system according to claim 1, wherein said second color measurement device is a scanner.

8. The calibration system according to claim 1, wherein said information of the second color space used by said color adjustment unit is information on a color of said second color space in a complementary color relationship with the targeted color of said color material.

9. A method of calibrating a printing device by means of a calibrator, comprising:
outputting, by said printing device, a patch sheet having a plurality of patch patterns based on different gradation values for each color of color material that is used;
receiving, by said calibrator, an instruction to select a device from among a plurality of color measurement devices comprising a first color measurement device and a second color measurement device of a lower color measurement accuracy than that of said first color measurement device;
receiving, by said calibrator, color measurement results data for said patch sheet that is color-measured by said color measurement device selected by said selection instruction;
acquiring, by said calibrator, color measurement values for each of said patch patterns on the basis of said received color measurement result data; and
determining, by said calibrator, for each of the colors of said color material, color measurement values for all the possible gradation values on the basis of each of said acquired color measurement values and said gradation values of the respective patch patterns corresponding with each of said color measurement values, and generating, by said calibrator, color correction information of said printing device by comparing said determined color measurement values with predetermined standard values,
wherein said output patch sheet is common irrespective of said color measurement device selected by said selection instruction; and
when said first color measurement device is selected by said selection instruction, said calibrator represents said color measurement values determined for all the gradation values by means of information of a first color space that differs from the color space of said color material, and compares said color measurement values with said standard values in a three-dimensional space; and,
when said second color measurement device is selected by said selection instruction, said calibrator represents said color measurement values determined for all the gradation values by means of information of said first color space and information of a second color space that differs from the color space of said color material and said first color space, and compares said color measurement values with said standard values in a four-dimensional space; and wherein the first color space is L*a*b* and the second color space is any one of R, G or B.

* * * * *